United States Patent
Venkataraghavan

(10) Patent No.: US 12,556,306 B2
(45) Date of Patent: Feb. 17, 2026

(54) SYSTEM, METHOD, AND COMPUTER PROGRAM FOR MANAGING DATA PACKETS TRANSMISSION BETWEEN NETWORK NODES BASED ON PRE-DEFINED CONFIGURATION AND DYNAMIC CONFIGURATION

(71) Applicant: RAKUTEN MOBILE, INC., Tokyo (JP)

(72) Inventor: Krishnan Venkataraghavan, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 279 days.

(21) Appl. No.: 18/012,356

(22) PCT Filed: Oct. 27, 2022

(86) PCT No.: PCT/US2022/048048
§ 371 (c)(1),
(2) Date: Dec. 22, 2022

(87) PCT Pub. No.: WO2024/091241
PCT Pub. Date: May 2, 2024

(65) Prior Publication Data
US 2024/0243846 A1    Jul. 18, 2024

(51) Int. Cl.
*H04L 1/08*    (2006.01)
*H04L 43/0829*    (2022.01)
*H04L 1/1867*    (2023.01)

(52) U.S. Cl.
CPC ............ *H04L 1/08* (2013.01); *H04L 43/0835* (2013.01); *H04L 1/1874* (2013.01)

(58) Field of Classification Search
None
See application file for complete search history.

(56) References Cited

U.S. PATENT DOCUMENTS

2007/0255993 A1\* 11/2007 Yap .................... H04B 7/0413
714/748
2010/0039938 A1    2/2010 Sagfors
(Continued)

FOREIGN PATENT DOCUMENTS

WO    WO-2019032087 A1 \*    2/2019    ............. H04L 1/189

OTHER PUBLICATIONS

International Search Report dated Mar. 10, 2023 issued in International Application No. PCT/US22/48048.
(Continued)

*Primary Examiner* — The HY Nguyen
(74) *Attorney, Agent, or Firm* — Sughrue Mion, PLLC

(57) ABSTRACT

Provided are system, method, and device for managing data packets transmission between network nodes based on one or more configurations. The system includes: a first network node including: a memory storing instructions; and at least one processor configured to execute the instructions to: transmit one or more data packets stored in a buffer to a second network node; determine whether or not a re-transmission of the one or more data packets is required; determine a type of the re-transmission, based on determining that the re-transmission is required; re-transmit the one or more data packets based on the determined type of the re-transmission; and clear the one or more data packets from the buffer, based on determining that the re-transmission is not required.

20 Claims, 18 Drawing Sheets

(56) References Cited

U.S. PATENT DOCUMENTS

2012/0155458 A1* 6/2012 Larson ................. H04L 69/163
  370/389
2024/0243846 A1* 7/2024 Venkataraghavan ... H04L 1/188

OTHER PUBLICATIONS

Written Opinion dated Mar. 10, 2023 issued in International Application No. PCT/US22/48048.

* cited by examiner

SYSTEM, METHOD, AND COMPUTER PROGRAM FOR MANAGING DATA PACKETS TRANSMISSION BETWEEN NETWORK NODES BASED ON PRE-DEFINED CONFIGURATION AND DYNAMIC CONFIGURATION

CROSS REFERENCE TO RELATED APPLICATIONS

This application is a National Stage of International Application No. PCT/US2022/048048, filed Oct. 27, 2022.

1. FIELD

Systems and methods consistent with example embodiments of the present disclosure relate to the field of network systems, and more particularly, to systems and methods for managing data packets transmission between network nodes during a node switching operation.

2. DESCRIPTION OF RELATED ART

In a related art system and method, data packet losses occur between network nodes during a node switching operation. For instance, during node switching in a handover operation, the data packets transmitted between network nodes may experience unintended losses due to various reasons, such as weak connection between the network nodes (e.g., weak radio channels between a user equipment and one or more of a first network node and a second network node, weak interface between the first network node and the second network node, etc.), network congestion in one or more network nodes, and the like.

Data packet losses during node switching operations may cause severe impacts in a service provided by the network nodes, particularly when the service is time-sensitive, requires high content accuracy, and requires seamless node switching. For instance, in real-time services such as voice call, video conferencing, or broadcasting, a small percentage of data packet losses may result in noticeable session jitter, service drops, or high latency, which may in turn result in missing of essential content and causes the respective session to be unintelligible.

Further, in the related art, data packets stored in a buffer of a network node will be removed after transmitting to another network node. Accordingly, in order to recover any data packet(s) lost during a node switching operation, the network node is required to re-obtain the data packet(s). Nevertheless, the recovery of the lost data packet(s) in the related art requires a long turn-around time, which is not suitable for recovering data packet(s) for time-sensitive services.

SUMMARY

According to embodiments, systems, methods, and devices are provided for effectively recovering any potential data packets loss during a node switching operation. Specifically, example embodiments of the present disclosures allow automatic re-transmission of data packets during the node switching operation based on one or more pre-defined configurations and/or one or more dynamic configurations, before a data packets loss is notified. Accordingly, any data packet which may be potentially lost during the node switching operation can be timely recovered, the rate of data packet losses can thereby be significantly reduced or be avoided.

According to embodiments, a system includes: a first network node including: a memory storing instructions; and at least one processor configured to execute the instructions to: transmit one or more data packets stored in a buffer to a second network node; determine whether or not a re-transmission of the one or more data packets is required; determine a type of the re-transmission, based on determining that the re-transmission is required; re-transmit the one or more data packets based on the determined type of the re-transmission; and clear the one or more data packets from the buffer, based on determining that the re-transmission is not required.

The at least one processor of the first network node may be further configured to execute the instructions to: determine whether or not one or more data packets have been lost during transmission; and based on determining that one or more data packets have been lost during transmission, determine information of the lost one or more data packets.

The type of re-transmission may be a re-transmission based on one or more dynamic configurations Further, the at least one processor of the first network node may be configured to execute the instructions to determine whether or not the re-transmission of the one or more data packets is required by: configuring a first parameter based on the determined information of the lost one or more data packets; determining a state of the configured first parameter; based on determining that the configured first parameter includes a first state, determining that the re-transmission of the one or more data packets is required; and based on determining that the configured first parameter includes a second state, determining that the re-transmission of the one or more data packets is not required.

Furthermore, the at least one processor of the first network node may be configured to execute the instructions to re-transmit the one or more data packets by: determining one or more data packets to be re-transmitted; determining whether or not a condition for re-transmitting the determined one or more data packets is met; and based on determining that the condition is met, re-transmitting the determined one or more data packets to the second network node.

The at least one processor of the first network node may be configured to execute the instructions to determine the one or more data packets to be re-transmitted by: configuring a second parameter based on the determined information of the lost one or more data packets; and determining the one or more data packets to be re-transmitted based on the configured second parameter.

The at least one processor of the first network node may be configured to execute the instructions to determine whether or not the condition for re-transmitting the determined one or more data packets is met by: configuring a third parameter based on the determined information of the lost one or more data packets; determining whether or not the configured third parameter is greater than a first pre-defined value; based on determining that the configured third parameter is greater than the first pre-defined value, determining that the condition for re-transmitting the determined one or more data packets is met; and based on determining that the configured third parameter is less than or equal to the first pre-defined value, determining that the condition for re-transmitting the determined one or more data packets is not met.

In addition, the at least one processor of the first network node may be configured to execute the instructions to determine whether or not the condition for re-transmitting the determined one or more data packets is met by: configuring a fourth parameter based on the determined information of the lost one or more data packets; determining whether or not the configured fourth parameter is greater than a second pre-defined value; based on determining that the configured fourth parameter is greater than the second pre-defined value, determining that the condition for re-transmitting the determined one or more data packets is met; and based on determining that the configured fourth parameter is less than or equal to the second pre-defined value, determining that the condition for re-transmitting the determined one or more data packets is not met.

According to embodiments, a method, performed by at least one processor, includes: transmitting, by a first network node, one or more data packets stored in a buffer to a second network node; determining, by the first network node, whether or not a re-transmission of the one or more data packets is required; determining, by the first network node, a type of the re-transmission, based on determining that the re-transmission is required; re-transmitting, by the first network node, the one or more data packets based on the determined type of the re-transmission; and clearing, by the first network node, the one or more data packets from the buffer, based on determining that the re-transmission is not required.

The method may further include: determining, by the first network node, whether or not one or more data packets have been lost during transmission; and based on determining that one or more data packets have been lost during transmission, determining information of the lost one or more data packets.

The type of re-transmission may be a re-transmission based on one or more dynamic configurations.

The determining whether or not the re-transmission of the one or more data packets is required may include: configuring a first parameter based on the determined information of the lost one or more data packets; determining a state of the configured first parameter; based on determining that the configured first parameter includes a first state, determining that the re-transmission of the one or more data packets is required; and based on determining that the configured first parameter includes a second state, determining that the re-transmission of the one or more data packets is not required.

The re-transmitting the one or more data packets may include: determining one or more data packets to be re-transmitted; determining whether or not a condition for re-transmitting the determined one or more data packets is met; and based on determining that the condition is met, re-transmitting the determined one or more data packets to the second network node.

The determining the one or more data packets to be re-transmitted may include: configuring a second parameter based on the determined information of the lost one or more data packets; and determining the one or more data packets to be re-transmitted based on the configured second parameter.

The determining whether or not the condition for re-transmitting the determined one or more data packets is met may include: configuring a third parameter based on the determined information of the lost one or more data packets; determining whether or not the configured third parameter is greater than a first pre-defined value; based on determining that the configured third parameter is greater than the first pre-defined value, determining that the condition for re-transmitting the determined one or more data packets is met; and based on determining that the configured third parameter is less than or equal to the first pre-defined value, determining that the condition for re-transmitting the determined one or more data packets is not met.

Further, the determining whether or not the condition for re-transmitting the determined one or more data packets is met may include: configuring a fourth parameter based on the determined information of the lost one or more data packets; determining whether or not the configured fourth parameter is greater than a second pre-defined value; based on determining that the configured fourth parameter is greater than the second pre-defined value, determining that the condition for re-transmitting the determined one or more data packets is met; and based on determining that the configured fourth parameter is less than or equal to the second pre-defined value, determining that the condition for re-transmitting the determined one or more data packets is not met.

According to embodiments, a non-transitory computer-readable recording medium having recorded thereon instructions executable by a processor to cause the processor to perform a method including: transmitting, by a first network node, one or more data packets stored in a buffer to a second network node; determining, by the first network node, whether or not a re-transmission of the one or more data packets is required; determining, by the first network node, a type of the re-transmission, based on determining that the re-transmission is required; re-transmitting, by the first network node, the one or more data packets based on the determined type of re-transmission; and clearing, by the first network node, the one or more data packets from the buffer, based on determining that the re-transmission is not required.

The method may further include: determining, by the first network node, whether or not one or more data packets have been lost during transmission; and based on determining that one or more data packets have been lost during transmission, determining information of the lost one or more data packets.

The type of re-transmission may be a re-transmission based on one or more dynamic configurations.

The re-transmitting the one or more data packets may include: determining one or more data packets to be re-transmitted; determining whether or not a condition for re-transmitting the determined one or more data packets is met; and based on determining that the condition is met, re-transmitting the determined one or more data packets to the second network node.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1A:
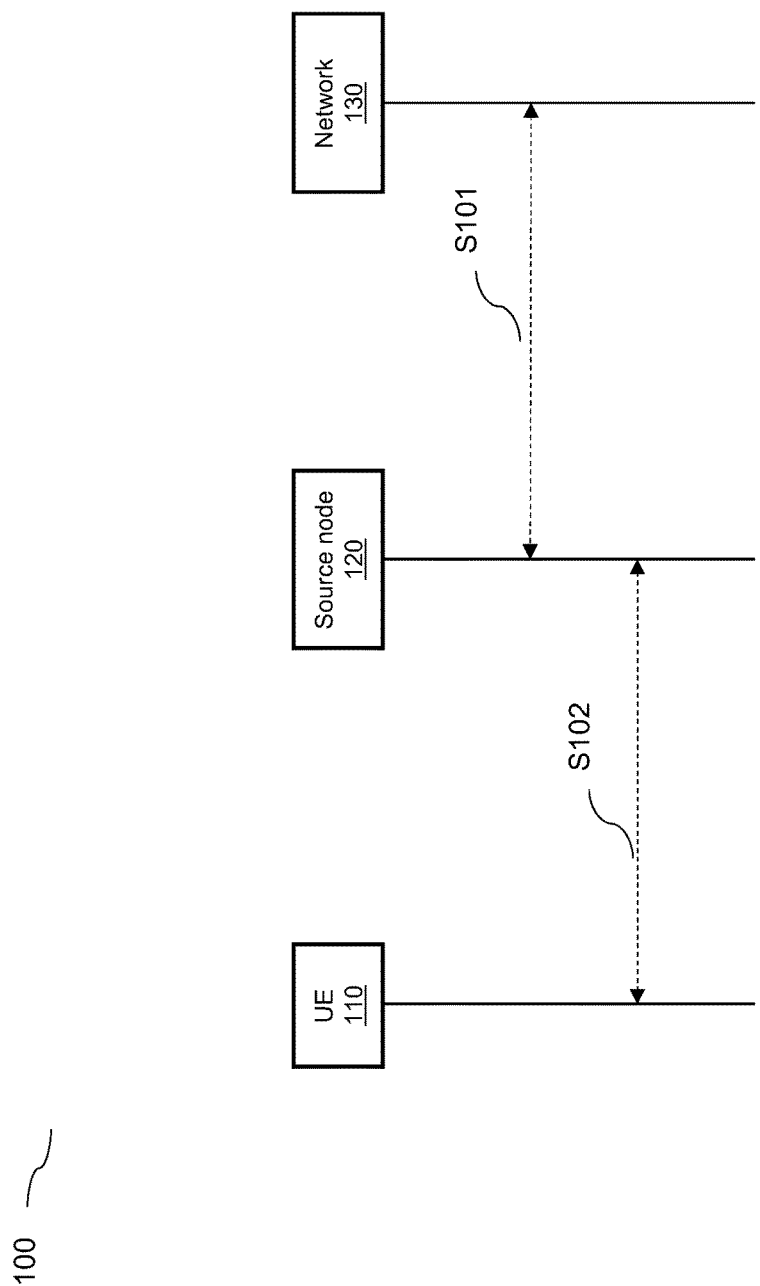
FIG. 1A illustrates an example flow diagram of data packet transmission in a related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Furthermore, although only one source node, one target node, and one user equipment (UE) are described herein, it is apparent that more than one target node, more than one target node, and/or more than one UE can be included in any of the example embodiments described herein.

In addition, although it is described herein below that one or more operations of the present disclosure may be performed as per bearer, it is contemplated that one or more operations of the present disclosure may also be performed in any other suitable manner, such as performed as per service type, as per operation requirement, and the like, without departing from the scope of the present disclosure.

Data packet transmission is widely utilized in network systems, such as 4G long term evolution (LTE) network systems and 5G new radio (NR) network systems, in which the information exchange and network node communications are achieved via data packet transmission. For instance, in order to transmit an information (e.g., a voice call, a video stream, etc.) among a plurality of network nodes, said information may first be segregated into multiple data packets and then transmitted among the plurality of network nodes thereafter. The terms "data packets" as used herein may refer to any type of binary, numeric, voice, video, textual, script data, any type of programming codes, or any other suitable data or information in any appropriate format that can be communicated from one point to another in any nodes of a network.

The data or information may be transmitted via different bearers. For instance, a signaling radio bearers (SRB) may be utilized for the transfer of control plane related data or information (e.g., Radio Resource Configuration (RRC)

messages, Non-Access Stratum (NAS) messages, etc.) between a user equipment (UE) and other network nodes (e.g., Mobility Management Entity (MME), base station, etc.). There are multiple types of SRB (e.g., SRB0, SRB1, SRB2) each of which may be utilized under different situation. On the other hand, a data radio bearer (DRB) may be utilized for the transfer of data or information of user plane traffic. Data radio bearer may be categorized into two types, i.e., default data bearer and dedicated data bearer, which may be utilized under different situation (e.g., default bearer may be utilized for transmitting a message related to a multimedia network, dedicated bearer may be utilized for handling Voice over Internet Protocol (VOIP) traffic, etc.).

FIG. 1A illustrates an example flow diagram of data packet transmission in a related art. In this example use case, a user accesses a network 130 (e.g., a packet data network such as internet, etc.) via a user equipment (UE) 110 to obtain information from the network 130, wherein the information is hosted in and provided via the network 130 in the form of data packets.

Referring to FIG. 1A, at operation S101, a source node 120 (e.g., a LTE eNodeB, a NR gNodeB, etc.) obtains, from network 130, data packets associated with an information (e.g., information intended by a user of UE 110, information to be sent to UE 110 from another network node, etc.). It is contemplated that the source node 120 may communicate with network 130 via other network nodes, such as service gateway (SGW), packet data network gateway (PGW), and the like, without departing from the scope of the present disclosure. Accordingly, at operation S102, the source node 120 transmits the obtained data packets to the UE 110, and the UE 110 may then process the data packets to present the information to the user.

In some situations, a node switching operation, in which the network node communicatively coupling the UE 110 with the network 130 switches or changes from one to another, is required. For instance, the source node 120 may initiate the node switching operation based on determining that the source node 120 has insufficient resources to maintain stable communication with the UE 110 and/or the network 130. On the other hand, the node switching may also be requested by the UE 110 based on determining that the signal strength between the UE 110 and the source node 120 is weak or there is another network node which may provide better quality of service.

The node switching operation includes, but is not limited to, handover operations defined in specifications of 3$^{rd}$ Generation Partnership Project (3GPP). For instance, the node switching operations may be intra-LTE handover operations, inter-LTE handover operations, 5G intra-gNB handover operations, 5G inter-gNB handover, inter-radio access technology (RAT) handover operations, and the like.

As discussed in below, a data packet may be lost during a node switching operation. Whenever a data packet loss is detected, a recovery process or operation may be initiated to recover the lost data packet. Nevertheless, the recovery process in the related art may results in data packet delays, which may not be tolerable in certain situations. Specifically, different service types may have different tolerance to data packet delays. By way of example, a downloading operation of a file (e.g., via file transfer protocol (FTP), etc.) may have a higher tolerance to data packet delays (since the completeness of the downloaded data packets may be more critical than the speed of data packets transmission) as compared to an emergency communication service (since said service may require continuous communication to be maintained and is sensitive to data packet delays). Similarly, different bearer types may also have different tolerance to data packet delays. For example, a Packet Data Convergence Protocol (PDCP) delay budget may vary according to bearer (e.g., bearers with guaranteed bit rate (GBR) may have a packet delay budget different from bearers with non-GBR, etc.) which in turns result in different tolerance to data packet delays per bearer, and the like.

Recently, the requirements on both low data packet loss and low data packet delay have increased. For example, services such as conference meetings which involves real-time voice and/or video discussion from multiple users, online gaming which involves real-time multiplayer interaction, and the like, have high requirements on service quality (e.g., image quality, voice quality, etc.) and low data packet delay (e.g., low latency, low jitter, etc.). Accordingly, the demand for providing a mechanism for fulfilling both of said requirements in node switching operation is increasing, and there is a need to provide recovery of lost data packet in a more efficient and effective manner.

Figure 1B:
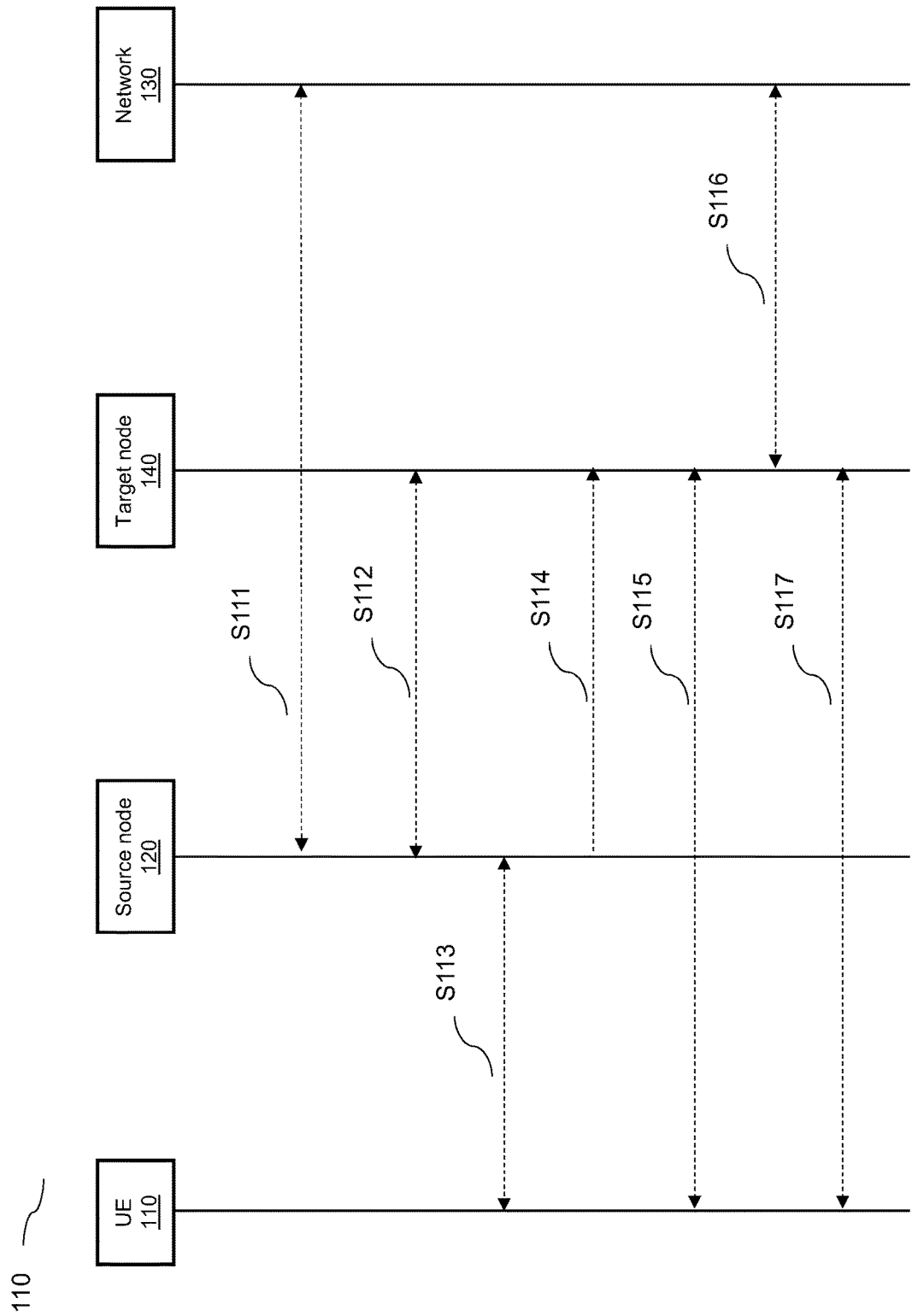
FIG. 1B illustrates an example flow diagram of a node switching operation in the related art.

FIG. 1B illustrates an example flow diagram of a node switching operation in the related art.

Referring to FIG. 1B, at operation S111, source node 120 obtains data packets associated with an information from network 130. Nevertheless, before providing the obtained data packets to UE 110, source node 120 determines (e.g., based on internal resources monitoring, based on a measurement report provided by UE 110, etc.) that a node switching operation is required.

During this time period, the UE 110 may not have a connection (or may only have a weak connection) with the source node 120. Thus, instead of transmitting the obtained data packets to UE 110 (as illustrated in FIG. 1A), source node 120 stores the obtained data packets in a buffer (e.g., buffer at Packet Data Convergence Protocol (PDCP) layer, etc.) and initiates the node switching operation.

At operation S112, source node 120 establishes a communication with a target node 140 (i.e., a node which will replace source node 120 in communicating UE 110 with network 130).

At operation S113, source node 120 provides the information of target node 140 to UE 110 and request UE 110 to establish (e.g., via RRC Connection Reconfiguration Operation, etc.) a communication with the target node 140. The communication between source node 120 and UE 110 ends at this point.

At operation S114, source node 120 provides the information associated with the UE 110 (e.g., user plane data, sequence number (SN) status transfer data, etc.), as well as the data packets stored in the buffer, to the target node 140. Subsequently, source node 120 clears the data packets stored in the buffer.

At operation S115, target node 140 transmits the received data packets (which were provided by the source node 120 in operation S114) to UE 110. The node switching operation may end at this point since the UE 110 has been successfully switched from source node 120 to target node 140.

Alternatively, after operation S115, the target node 140 may establish a communication with network 130 and may obtain new data packets from network 130 at operation S116. Subsequently, at operation S117, target node 140 transmits the new data packets to UE 110.

Data packet loss is a phenomena in which one or more data packets fail to arrive at an intended network node after being transmitted across the network. Data packet loss may occur during the node switching operation due to various reasons, such as but not limited to: network congestion, weak linking or signaling between network nodes (e.g., between a source node and a target node, between a target node and a UE, etc.), faulty software and/or hardware within the network nodes, and malicious attacks.

Figure 2:
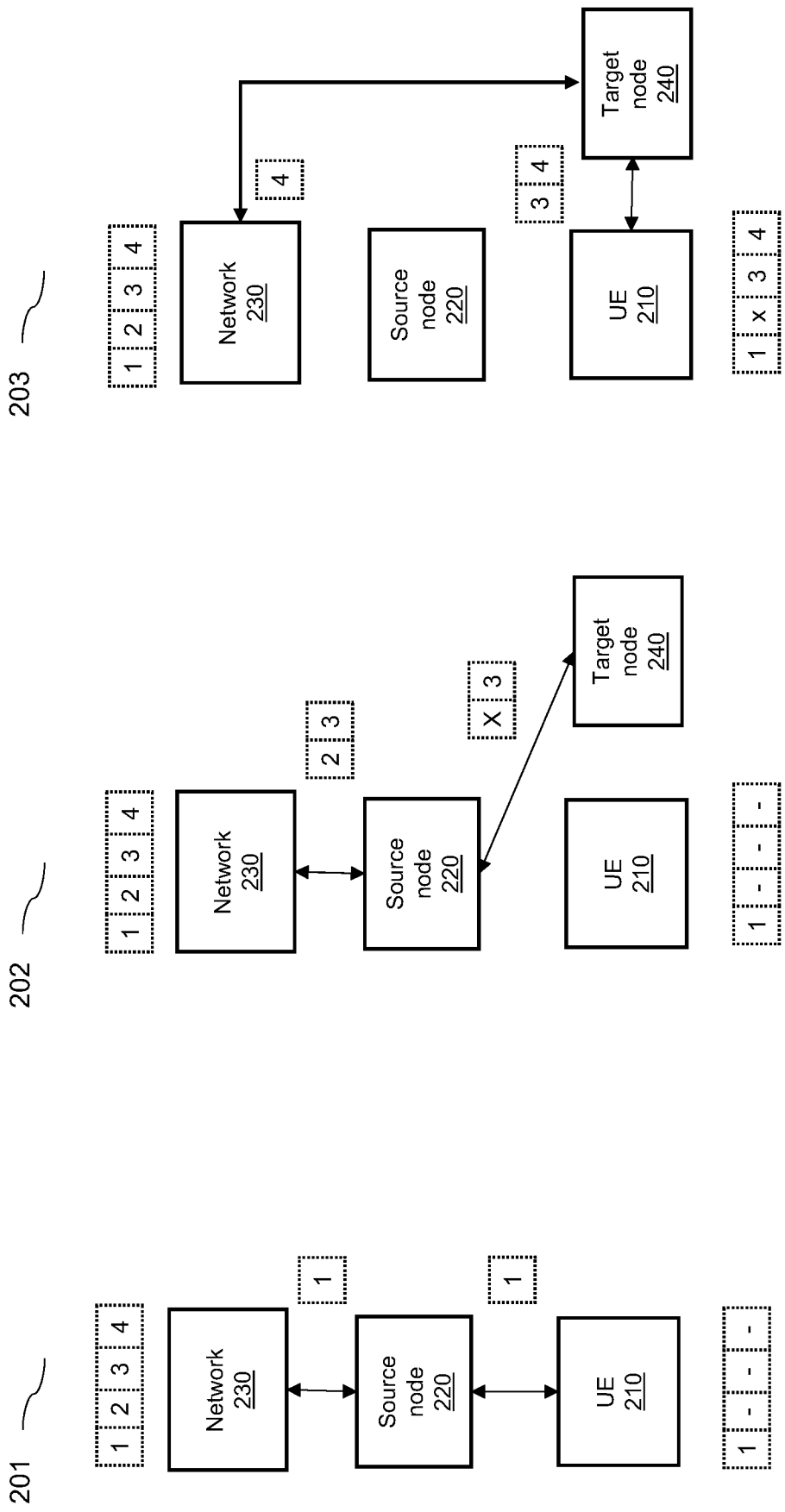
FIG. 2 illustrates an example use case of a node switching operation in the related art.

FIG. 2 illustrates an example use case in which data packet loss occurs during a node switching operation in the related art. Referring to FIG. 2, stage 201 illustrates data packet transmission before the node switching operation, stage 202 illustrates data packet transmission during the node switching operation, and stage 203 illustrates data packet transmission after the node switching operation.

In this example use case, at stage 201, sour node 220 obtains, from a network 230, data packets (e.g., data packet 1, data packet 2, data packet 3, etc.) associated with an information hosted in the network 230.

Upon obtaining the data packets, the source node 220 may store said data packets in a buffer. For instance, the source node 220 may queue said data packets in the buffer in a sequential manner. Subsequently, the source node 220 may schedule transmission of each data packet to UE 210. In the example use case illustrated in FIG. 2, source node 220 may first transmit data packet 1 to UE 210.

At stage 202, before transmitting data packet 2 and data packet 3 to UE 210, source node 220 determines that a node switching operation is required. Accordingly, source node 220 establishes a communication with a target node 240.

Subsequently, source node 220 transmits data packet 2 and data packet 3 to target node 240, such that target node 240 can send said data packets to UE 210 after establishing a communication with UE 210. Source node 220 clears data packet 2 and data packet 3 from the buffer thereafter. Nevertheless, one or more of these forwarded data packets may fail to arrive at the target node 240 and/or the UE 210, due to various possible reasons, such as weak or lossy interface between the source node and the target node, poor radio channel between the UE 210 and the target node 240, and the like. In the example use case illustrated in FIG. 2, data packet 2 fails to arrive at the target node 240 as a result of data packet loss. Thus, target node 240 receives only data packet 3 from source node 220.

At stage 203, target node 240 establishes communication with UE 210 and transmits data packet 3 to UE 210. Accordingly, target node 240 establishes a communication with network 230, obtains data packet 4 associated with the information from network 230, and transmits data packet 4 to UE 210.

In this example use case, since UE 210 does not receive all data packets associated with the information, UE 210 may not be able to provide said information to the user as it should (e.g., the provided information may be incomplete, the provided information may experience quality drop, etc.). In this regard, if the information is not time-sensitive, UE 210 may initiate a data retransmission procedure (e.g., upper-layer retransmission, lower-layer retransmission, etc.) upon indicating a missing data packet(s) in the downlink, so as to recover the missing data packet(s). This approach of recovering a lost data packet consumes additional network resources in the network nodes (e.g., UE 210, network 230, etc.). Further, said approach has a long round-trip time, which may cause intolerable delay in providing the information to the user and is thus not suitable for recovering lost time-sensitive data packet.

On the other hand, if the information is time-sensitive (e.g., UE 210 requires data packet 2 for real-time or near real-time packet processing, etc.), UE 210 may simply disregard data packet 2 and process only data packet 1, data packet 3, and data packet 4 to present the associated information to the user, so as to avoid any delay in presenting the information to the user. In this case, the presented information may experience a quality drop (e.g., low resolution in an image, audio/video jitter, etc.), and the presented information may be unintelligible if the lost data packet 2 contains important information.

Figure 3:
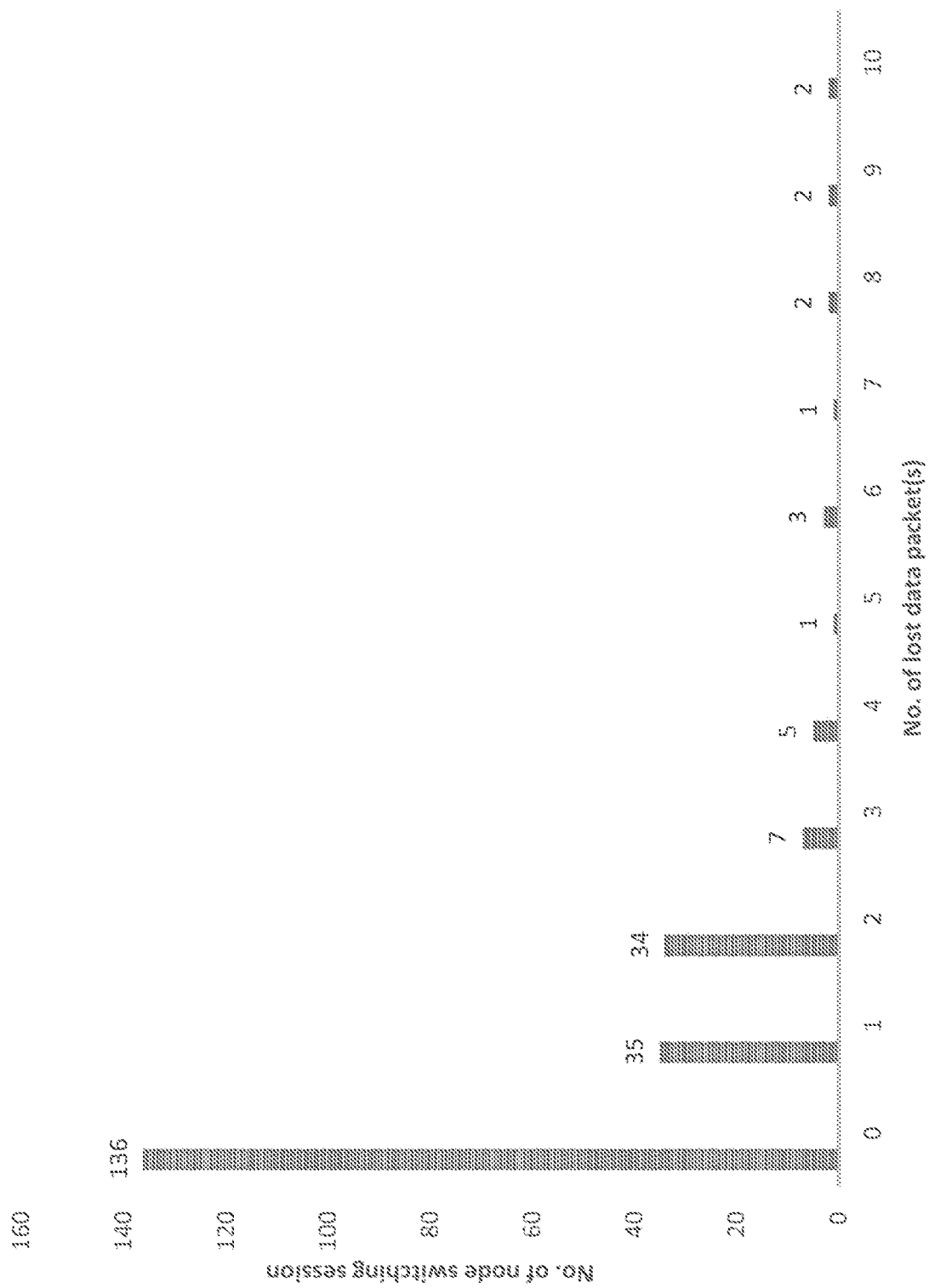
FIG. 3 illustrates an example graph of data packet lost during node switching sessions.

FIG. 3 illustrates an example graph of data packet loss during node switching sessions. Referring to FIG. 3, a total of 228 node switching sessions have been recorded, among which 136 sessions have no data packet loss, 35 sessions have lost 1 data packet, 34 sessions have lost 2 data packets, 7 sessions have lost 3 data packets, 5 sessions have lost 4 data packets, 1 session has lost 5 data packets, 3 sessions have lost 6 data packets, 1 session has lost 7 data packets, 2 sessions have lost 8 data packets, 2 sessions have lost 9 data packets, and 2 session have lost 10 data packets. Namely, 92 out of 228 (i.e., approximately 40%) of the node switching sessions experience data packet loss.

Example embodiments of the present disclosure provide a system and method to effectively recover the data packet(s) lost during a node switching operation. Specifically, example embodiments of the present disclosures provide one or more re-transmissions of data packets during the node switching operation, so as to recover any potential data packet loss during the node switching operation. Accordingly, example embodiments of the present disclosure are effective in providing lossless and seamless node switching operations to services which require both low data packet loss and low data packet delay.

In some embodiments, example embodiments of the present disclosure provide a system and method to re-transmit one or more data packets based on one or more pre-defined configurations. In some embodiments, example embodiments of the present disclosure provides a system and method to re-transmit one or more data packets based on one or more dynamic configurations. In some embodiments, example embodiments of the present disclosure provides a system and method to re-transmit one or more data packets based on one or more pre-defined configurations and one or more dynamic configurations.

In some embodiments, a system and method may be provided to determine whether or not a re-transmission of data packet is required. The re-transmission of data packet may be configurable by a network operator. For instance, the re-transmission of data packet may be configured according to a bearer type, an application type, a specific operation, and the like. Accordingly, one or more operations of the re-transmission of data packet may be performed as per bearer, as per application, and the like. For descriptive purpose, one or more operations of the re-transmission of data packet may be described hereinafter as performed as per bearer, unless being explicitly described otherwise.

In some embodiments, a first parameter may be utilized in determining whether or not the re-transmission of data packet is required. The first parameter may be set to a "true" state defining a state in which the re-transmission of data packet is required or is enabled. On the other hand, the first parameter may be set to a "false" state defining a state in which the re-transmission of data packet is not required or is disabled. The first parameter may be configured as per bearer. For instance, the first parameter may have a first configuration (e.g., enabled, disabled, etc.) associated with a first bearer, and may have a second configuration (e.g., disabled, enabled, etc.) associated with a second bearer. Accordingly, the re-transmission of data packet may be performed as per bearer (e.g., re-transmission of data packet may be enabled for the first bearer, and at the same time may be disabled for the second bearer, etc.).

In some embodiments, the first parameter may be pre-determined by a network operator before the node switching operation and/or may be configurable by the network operator as per requirement. In some embodiments, the first parameter may be adjustable and/or may be configurable by a network node during and/or after the node switching operation. In some embodiments, the first parameter is included in a radio resource control (RRC) layer of a network node.

In some embodiments, a system and method may be provided to determine one or more data packets to be re-transmitted. In some embodiments, a second parameter may be utilized in determining the one or more data packets to be re-transmitted. The second parameter may be an integer defining a sequence number of a data packet. In some embodiments, the second parameter may be a range of values defining the sequence numbers of data packets. In some embodiments, the range of values may be in the range of 1 to 65535.

In some embodiments, the second parameter may be pre-determined by the network operator before the operation and/or may be configurable by the network operator as per requirement during and/or after the operation. For instance, the value of the second parameter may be pre-determined or be re-configured by the network operator based on a historical record of the data packet lost in historical node switching operations (e.g., a record as exemplified in FIG. 3, etc.). In some embodiments, the second parameter may be adjustable and/or may be configurable by a network node during and/or after the operation. Further, the second parameter may be configured as per bearer. For instance, the second parameter may be configured to have a first value for a first bearer, and may be configured to have second value for a second bearer. Accordingly, the determined one or more data packets to be re-transmitted may vary according to the bearer.

In some embodiments, a system and method may be provided to determine whether or not a first condition for re-transmitting the one or more data packets is met. In some embodiments, a third parameter may be utilized in determining whether or not the first condition is met. In some embodiments, the third parameter may comprise a timer value. The timer value of the third parameter may be associated with one or more configurations in a network node (e.g., target node). For instance, the timer value of the third parameter may be defined or configured based on a PDCP discard timer and/or one or more packet delay budgets in the network node.

In some embodiments, the third parameter may be pre-determined by the network operator before the operation and/or may be configurable by the network operator as per requirement during and/or after the operation. In some embodiments, the third parameter may be adjustable and/or may be configurable by a network node during and/or after the operation. Further, the third parameter may be configured as per bearer. For instance, the third parameter may be configured to have a first value for a first bearer, and may be configured to have a second value for a second bearer. Accordingly, the period of time of re-transmission of data packet may vary according to the bearer.

In some embodiments, a system and method may be provided to determine whether or not a second condition for re-transmitting the one or more data packets is met. In some embodiments, a fourth parameter may be utilized in determining whether or not the second condition is met. In some embodiments, the fourth parameter may comprise a counter value. The counter value of the fourth parameter may be associated with one or more configuration in a network node (e.g., target node). For instance, the counter value of the fourth parameter may be defined or configured based on a PDCP discard timer and/or one or more packet delay budgets in the network node.

In some embodiments, the fourth parameter may be pre-determined by the network operator before the operation and/or may be configurable by the network operator as per requirement during and/or after the operation. In some embodiments, the fourth parameter may be adjustable and/or may be configurable by a network node during and/or after the operation. Further, the fourth parameter may be configured as per bearer. For instance, the fourth parameter may be configured to have a first value for a first bearer, and may be configured to have second value for a second bearer. Accordingly, the number of attempt of re-transmission of data packet may vary according to the bearer.

In some embodiments, a system and method may be provided to determine a type of re-transmission of the one or more data packets. In some embodiments, a fifth parameter may be utilized in determining the type of re-transmission. The fifth parameter may comprise an indicator (e.g., a statement, a value, etc.) defining that a first type of re-transmission (e.g., "default", "pre-defined", etc.) is intended and/or is enabled. Further, the fifth parameter may comprise an indicator (e.g., a statement, a value, etc.) defining that a second type of re-transmission (e.g., "non-default", "dynamic", etc.) is intended and/or is enabled.

In some embodiments, the fifth parameter may be pre-determined by the network operator before the operation and/or may be configurable by the network operator as per requirement during and/or after the operation. In some embodiments, the fifth parameter may be adjustable and/or may be configurable by a network node during and/or after the node switching operation. Further, the fifth parameter may be configured as per bearer. For instance, the firth parameter may be configured to have the indicator defining the first type of re-transmission for a first bearer, and may be configured to have the indicator defining the second type of re-transmission for a second bearer. Accordingly, the type of re-transmission of data packet may vary according to the bearer.

In some embodiments, the network node may be a base station. In some embodiments, the base station may be a LTE eNodeB. In some embodiments, the base station may be a NR gNodeB. In some embodiments, the base station may be a source base station which initiates the node switching operation. In some embodiments, the base station may be a target base station to which the source base station is transmitting one or more data packets.

The operations of utilizing the first parameter, the second parameter, the third parameter, the fourth parameter, and/or the fifth parameter in re-transmission of one or more data packets according to one or more pre-defined configurations are described hereinbelow with reference to FIG. 4 to FIG. 7. The operations of utilizing the first parameter, the second parameter, the third parameter, the fourth parameter, and/or the fifth parameter in re-transmission of the one or more data packets according to one or more dynamic configurations are described hereinbelow with reference to FIG. 8 to FIG. 13. The operations of utilizing the first parameter, the second parameter, the third parameter, the fourth parameter, and/or the fifth parameter in re-transmission of the one or more data packets according to one or more pre-defined configurations and/or one or more dynamic configurations are described hereinbelow with reference to FIG. 14.

The terms "pre-defined configuration" described herein refer to one or more configurations defined by the value or the setting of the first parameter, the second parameter, the third parameter, the fourth parameter, and/or the fifth parameter pre-determined or configured by the network operator, while the terms "dynamic configuration" described herein refer to one or more configurations defined by the value or the setting of the first parameter, the second parameter, the third parameter, the fourth parameter, and/or the fifth parameter which are adjusted or configured by the network node during node switching operation.

Figure 4:
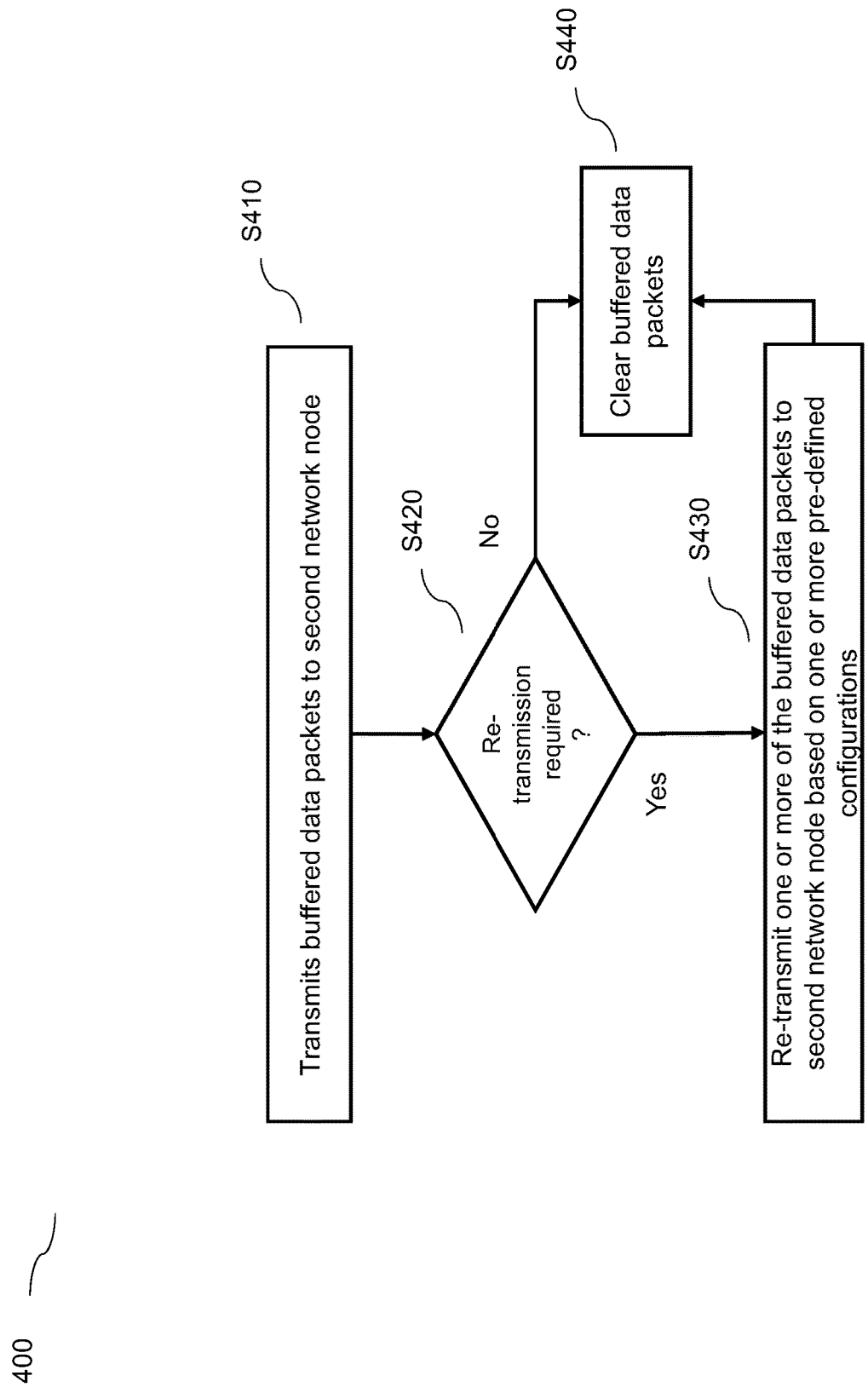
FIG. 4 illustrates an example flow diagram of a data packet recovery operation based on one or more pre-defined configurations, according to one or more embodiments.

FIG. 4 illustrates an example flow diagram of method 400 of a data packet recovery operation based on one or more pre-defined configurations, according to one or more embodiments. In some embodiments, method 400 may be performed by a first network node (e.g., a source node) during a node switching operation. In this regard, the second network node illustrated in FIG. 4 may be a target node, to which the source node is transmitting one or more data packets.

Method 400 may be initiated after the first network node has obtained one or more data packets for a third network node (e.g., a UE, etc.) and after the first network node has established a communication with the second network node. In this regard, the first network node may be configured to store the obtained one or more data packets in a buffer (said data packets are referred to as "buffered data packets" hereinafter) and to perform method 400 thereafter.

In some embodiments, the node switching operation may be a LTE-based handover operation, the first network node may be a source eNodeB, the second network node may be a target eNodeB, and the first network node may communicate with the second network node via a X2 interface. In some embodiments, the node switching operation may be a 5G-based handover operation, the first network node may be a source gNodeB and the second network node may be a target gNodeB, and the first network node may communicate with the second network node via an Xn interface. In some embodiments, the first network node may be a source gNodeB and the second network node may be a target eNodeB. In some embodiments, the first network node may be a source eNodeB and the second network node may be a target gNodeB.

Referring to FIG. 4, at operation S410, the first network node may be configured to transmit one or more buffered data packets (i.e., one or more data packets stored in a buffer) to the second network node. In some embodiments, the first network node may be configured to transmit all buffered data packets to the second network node. In some embodiments, the first network node may be configured to transmit a portion of buffered data packets to the second network node.

At operation S420, the first network node may be configured to determine whether or not a re-transmission of buffered data packets is required. Specifically, the first network node may be configured to determine, based on the first parameter, whether or not the re-transmission of buffered data packets is enabled or disabled (e.g., by a network operator, etc.). In some embodiments, the first network node may be configured to determine that the re-transmission of buffered data packets is enabled or is required, based on determining that the first parameter comprises a "true" state. On the other hand, the first network node may be configured to determine that the re-transmission of buffered data packets is disabled or is not required, based on determining that the first parameter comprises a "false" state.

Based on determining that the re-transmission of the buffered data packets is required, the process proceeds to operation S430, at which the first network node may be configured to re-transmit one or more of the buffered data packets to the second network node. On the other hand, based on determining that the re-transmission of the buffered data packets is not required, the process proceeds to operation S440, at which the first network node may be configured to clear the buffered data packets (e.g., remove the buffered data packets from the buffer, etc.).

In some embodiments, one or more operations in method 400 may be performed as per bearer. For instance one or more of operations S410-S440 may be performed simultaneously for a plurality of bearers, may be performed in separate timing for the plurality of bearers, may be performed in a similar manner for the plurality of bearers, and/or may be performed in a different manner for the plurality of bearers.

By way of example, at operation S410, the first network node may be configured to transmit one or more buffered data packets to the second network node via a first bearer and may be configured to transmit one or more buffered data packets to the second network node via a second bearer.

Subsequently, at operation S420, the first network node may be configured to determine, based on a first configuration of the first parameter associated with the first bearer, whether or not the re-transmission of buffered data packets via the first bearer is required, and may be configured to determine, based on a second configuration of the first parameter associated with the second bearer, whether or not the re-transmission of buffered data packets via the second bearer is required.

Assuming that the first configuration of the first parameter associated with the first bearer defines that the re-transmission of buffered data packets is enabled for the first bearer and the second configuration of the first parameter associated with the second bearer defines that the re-transmission of buffered data packets is disabled for the second bearer, the first network node may be configured to re-transmit one or more of the buffered data packets to the second network node via the first bearer at operation S430, and may be configured to clear buffered data packets associated with the second bearer at operation S440.

Figure 5:
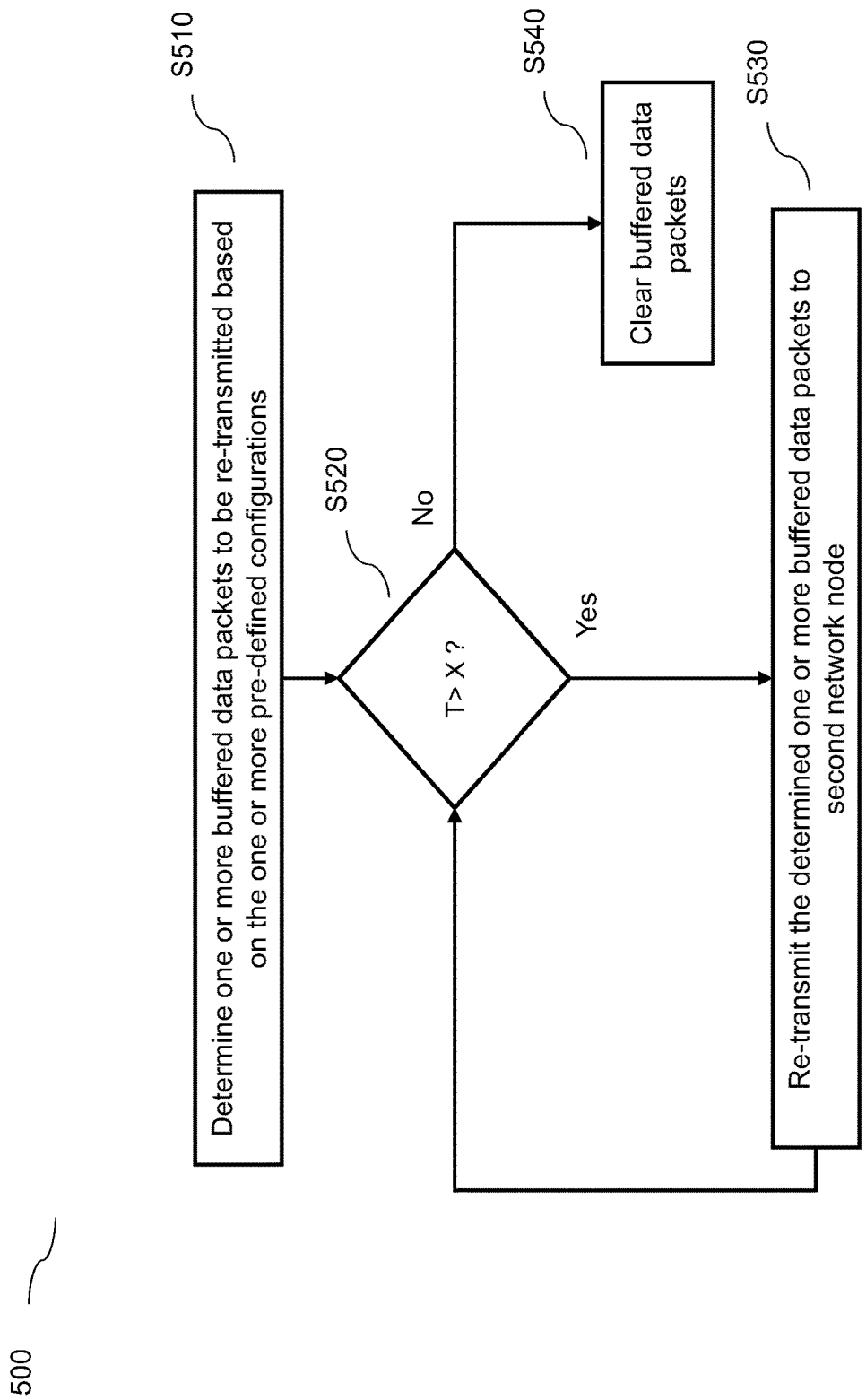
FIG. 5 illustrates an example flow diagram of a method for re-transmitting one or more buffered data packets based on one or more pre-defined configurations, according to one or more embodiments.

FIG. 5 illustrates an example flow diagram of a method 500 for re-transmitting one or more buffered data packets based on one or more pre-defined configurations, according to one or more embodiments. Method 500 may be a part of operation S430 in FIG. 4, and may be performed by the first network node.

Referring to FIG. 5, at operation S510, the first network node may be configured to determine one or more buffered data packets to be re-transmitted to the second network node. In some embodiments, the first network node may be configured to determine, based on the second parameter, which of the buffered data packets should be re-transmitted.

As discussed above, the second parameter may comprise an integer or a value, which the first network node utilizes to determine the buffered data packets to be re-transmitted. The integer or value of the second parameter may be a static value pre-defined or pre-configured by a network operator, may be a value selected based on a historical record of the data packet lost in historical node switching operations (e.g., selected based on the sequence number of data packet(s) lost in historical node switching operations, selected based on the tendency or pattern of data packet(s) lost in the historical node switching operations, etc.), or may be any value which may be appropriately configured or selected by the network operator, without departing from the scope of the present disclosure.

For instance, based on determining that the second parameter comprises a value of "2", the first network node may be configured to determine that the last two data packets stored in the buffer should be re-transmitted.

In some embodiments, each of the buffered data packets, when being received by the first network node, may be assigned a respective sequence number (e.g., Packet Data Convergence Protocol (PDCP) sequence number, etc.), and the first network node may be configured to determine the one or more buffered data packets to be re-transmitted by subtracting the value of the second parameter from the sequence number of the last data packet in the buffer. For instance, four buffered data packets are stored in the buffer, the last data packet in the buffer has a sequence number of 4, and the second parameter comprises a value of 2. Accordingly, the first network node may be configured to determine that subtracting the value of second parameter from the sequence number of the last buffered data packet results in a value of "2", and may thereby determine that the last two data packets stored in the buffer should be re-transmitted.

In another example, based on determining that the second parameter comprises a value of "2", the first network node may be configured to determine that the buffered data packets having the two largest packet size (i.e., a first buffered data packet having the largest packet size and a second buffered data packet having the second largest packet size) should be re-transmitted. In yet another example, based on determining that the second parameter has a value of "2", the first network node may be configured to determine (e.g., based on time-stamps associated with each of the buffered data packets, etc.) that the two most recently received buffered data packets should be re-transmitted.

In some embodiments, upon determining the one or more buffered data packets to be re-transmitted, the first network node may be configured to maintain only data packets to be re-transmitted in the buffer and discard other data packets (i.e., data packets which are not to be re-transmitted) from the buffer.

Upon determining the buffered data packets to be re-transmitted, the process proceeds to operation S520. At operation S520, the first network node may be configured to determine whether or not a condition for re-transmitting the one or more buffered data packets is met. Specifically, the first network node may be configured to determine whether or not a value of the third parameter (illustrated as "T" in FIG. 5) is greater than a pre-defined value (illustrated as "X" in FIG. 5).

In some embodiments, the value of the third parameter may be a timer value pre-set and/or configurable by the network operator, and the timer value begins to count down or decrease as soon as the one or more buffered data packets to be re-transmitted are determined (e.g., as soon as operation S510 is completed). In some embodiments, the timer value begins to count down or decrease after the one or more buffered data packets are re-transmitted by the first network node. In some embodiments, the pre-defined value indicates a threshold time period within which the attempt to re-transmit the one or more buffered data packets is allowed, and the pre-defined value may be pre-set and/or may be configurable by the network operator (e.g., based on PDCP layer parameter such as PDCP discard timer, etc.). In some embodiments, the pre-defined value may be zero. In some embodiments, the pre-defined value may be greater than zero.

The third parameter may be associated with one or more configurations and/or preconfigured rules in the second network node. For instance, the timer value of the third parameter may be associated with one or more PDCP configurations in the second network node. By way of example, the timer value of the third parameter may be defined or configured based on a PDCP discard timer and/or one or more packet delay budgets in the second network node.

Based on determining that the value of the third parameter is greater than the pre-defined value, the first network node determines that the condition for re-transmitting the buffered data packets is met, and the process proceeds to operation S530. At operation S530, the first network node may be configured to re-transmit the one or more buffered data packets (determined at operation S510) to the second network node, and the process returns to operation S520 thereafter. Accordingly, the first network node may be configured to again attempt to re-transmit the determined one or more buffered data packets to the second network node, until the condition for re-transmitting the buffered data packets is not met (e.g., until the value of the third parameter is less than or equal to the pre-defined value).

On the other hand, based on determining that the value of the third parameter is not greater than the pre-defined value (i.e., the value of the third parameter is less than or equal to the pre-defined value), the first network node determines that the condition for re-transmitting the buffered data packets is not met, and the process proceeds to operation S540. Similar to operation S440 in FIG. 4, at operation S540, the first network node may be configured to clear the buffered data packets (e.g., remove the buffered data packets from the buffer, etc.). In some embodiments, at operation 540, the first network node may also be configured to reset the value of the third parameter to the initially set value.

In some embodiments, one or more operations in method 500 may be performed as per bearer. For instance, one or more of operations S510-S540 may be performed simultaneously for a plurality of bearers, may be performed in separate timing for the plurality of bearers, may be performed in a similar manner for the plurality of bearers, and/or may be performed in a different manner for the plurality of bearers.

By way of example, at operation S510, the first network node may be configured to determine one or more buffered data packets to be re-transmitted to the second network node via a first bearer, and may be configured to determine one or more buffered data packets to be re-transmitted to the second network node via a second bearer.

Subsequently, at operation S520, the first network node may be configured to determine, based on a first value of the third parameter associated with the first bearer, whether or not a condition for re-transmitting the one or more buffered data packets to the second network node via the first bearer is met, and may be configured to determine, based on a second value of the third parameter associated with the second bearer, whether or not a condition for re-transmitting the one or more buffered data packets to the second network node via the second bearer is met.

Assuming that the condition for re-transmitting the one or more buffered data packets to the second network node via the first bearer is met, and the condition for re-transmitting the one or more buffered data packets to the second network node via the second bearer is not met, the first network node may be configured to re-transmit the determined one or more buffered data packets to the second network node via the first bearer at operation S530, and may be configured to clear buffered data packets associated with the second bearer at operation S540.

Figure 6:
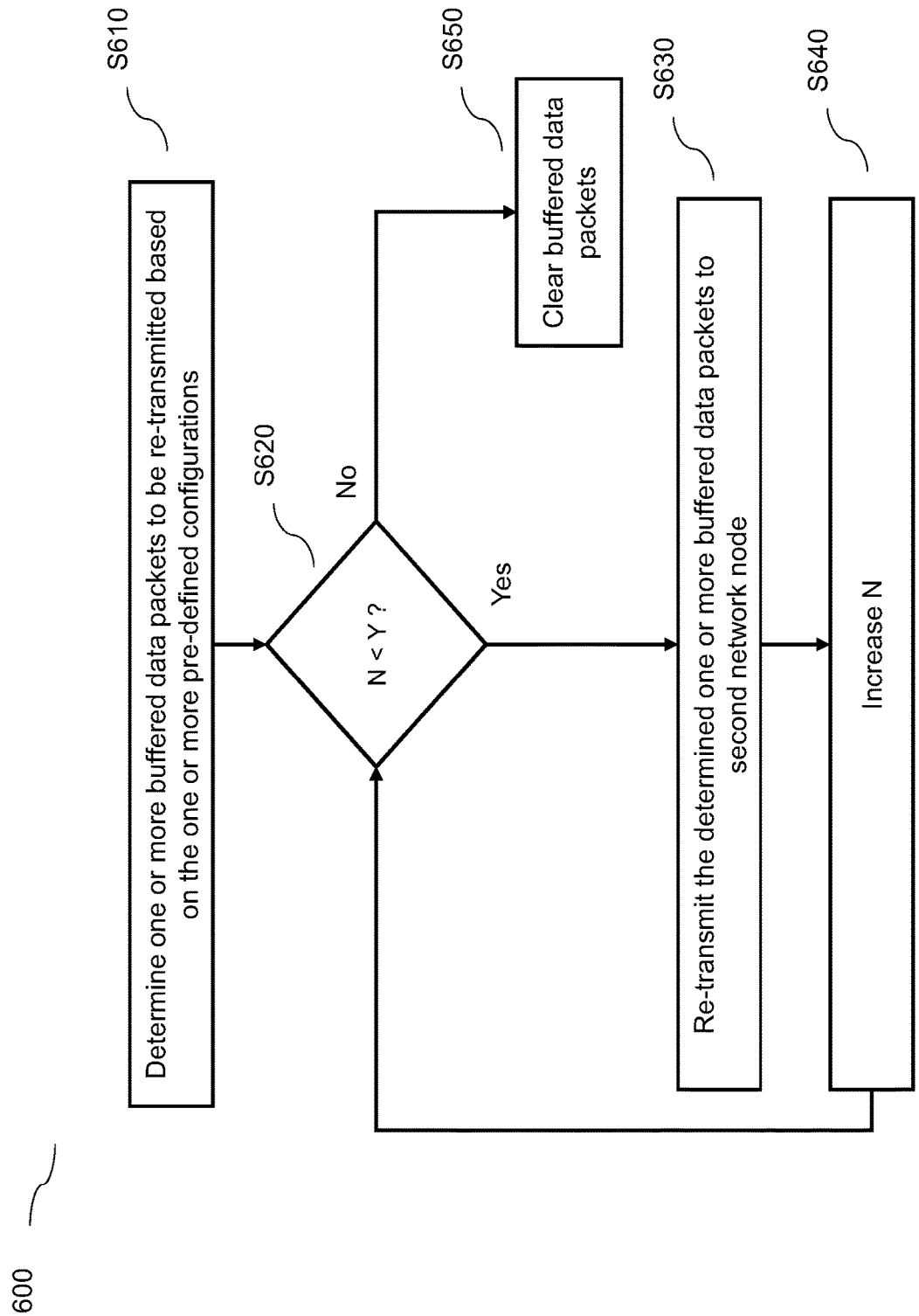
FIG. 6 illustrates another example flow diagram of a method for re-transmitting one or more buffered data packets based on one or more pre-defined configurations, according to one or more embodiments.

FIG. 6 illustrates another example flow diagram of a method 600 for re-transmitting one or more buffered data packets based on one or more pre-defined configurations, according to one or more embodiments. Method 600 may be a part of operation S430 in FIG. 4, and may be performed by the first network node.

Referring to FIG. 6, at operation S610, the first network node may be configured to determine one or more buffered data packets to be re-transmitted to the second network node. The details of this operation may be similar to those described in relation to operation S510 in FIG. 5, thus redundant descriptions associated therewith may be omitted below for conciseness.

Upon determining the buffered data packets to be re-transmitted at operation S610, the process proceeds to operation S620. At operation S620, the first network node may be configured to determine whether or not a condition for re-transmitting the buffered data packets is met. Specifically, the first network node may be configured to determine whether or not a value of the fourth parameter (illustrated as "N" in FIG. 6) is less than a pre-defined value (illustrated as "Y" in FIG. 6).

In some embodiments, the value of the fourth parameter may be a counter value pre-set and/or configurable by the network operator. In some embodiments, the value of the fourth parameter may be initially set to zero and may be increased according to a pre-set increasing order after each attempt to re-transmit the buffered data packets (to be further described below). In some embodiments, the pre-defined value may indicate the threshold of allowable attempts to re-transmit the one or more buffered data packets, and the pre-defined value may be pre-determined and/or may be configurable by the network operator.

Further, the fourth parameter may be associated with one or more configurations and/or preconfigured rules in the second network node. For instance, the counter value of the fourth parameter may be associated with one or more PDCP configurations in the second network node. By way of example, the counter value of the fourth parameter may be defined or configured based on a PDCP discard timer and/or one or more packet delay budgets in the second network node.

Based on determining that the value of the fourth parameter is less than the pre-defined value, the first network node determines that the condition for re-transmitting the buffered data packets is met, and the process proceeds to operation S630. At operation S630, the first network node may be configured to re-transmit the determined buffered data packets (determined at operation S610) to the second network node, and the process proceeds to operation S640.

Otherwise, based on determining that the value of the fourth parameter is not less than the pre-defined value (i.e., the value of the fourth parameter is greater than or equal to the pre-defined value), the first network node determines that the condition for re-transmitting the buffered data packets is not met, and the process proceeds to operation S650. Similar to operation S440 in FIG. 4 and operation S540 in FIG. 5, at operation S650, the first network node may be configured to clear the buffered data packets (e.g., remove the buffered data packets from the buffer, etc.). In some embodiments, at operation S650, the first network node may also be configured to reset the value of the fourth parameter to the initially set value.

At operation S640, the first network node may be configured to increase the value of the fourth parameter according to the pre-set increasing order. In some embodiments, the pre-set increasing order may be 1. In some embodiments, the pre-set increasing order may be more than 1. Further, the pre-set increasing order may be configured as per bearer (e.g., a first bearer may have a pre-set increasing order different from a second bearer's, etc.). Furthermore, the pre-set increasing order may be configured based on one or more configurations and/or preconfigured rules in the second network node. For instance, the pre-set increasing order may be associated with one or more PDCP configurations in the second network node. By way of example, the pre-set increasing order may be defined or configured based on a PDCP discard timer and/or one or more packet delay budgets in the second network node.

After increasing the value of the fourth parameter according to the pre-set increasing order, the process returns to operation S620. Accordingly, the first network node may again be configured to attempt to re-transmit the determined one or more buffered data packets to the second network node until the condition for re-transmitting the buffered data packets is not met (i.e., until the value of the fourth parameter is greater than or equal to the pre-defined value).

In some embodiments, one or more operations in method 600 may be performed as per bearer. For instance one or more of operations S610-S640 may be performed simultaneously for a plurality of bearers, may be performed in separate timing for the plurality of bearers, may be performed in a similar manner for the plurality of bearers, and/or may be performed in a different manner for the plurality of bearers.

By way of example, at operation S610, the first network node may be configured to determine one or more buffered data packets to be re-transmitted to the second network node via a first bearer, and may be configured to determine one or more buffered data packets to be re-transmitted to the second network node via a second bearer.

Subsequently, at operation S620, the first network node may be configured to determine, based on a first value of the fourth parameter associated with the first bearer, whether or not a condition for re-transmitting the one or more buffered data packets to the second network node via the first bearer is met, and may be configured to determine, based on a second value of the fourth parameter associated with the second bearer, whether or not a condition for re-transmitting the one or more buffered data packets to the second network node via the second bearer is met.

Assuming that the condition for re-transmitting the one or more buffered data packets to the second network node via the first bearer is met, and the condition for re-transmitting the one or more buffered data packets to the second network node via the second bearer is not met, the first network node may be configured to re-transmit the determined one or more buffered data packets to the second network node via the first bearer at operation S630 and increase the value of the fourth parameter according to the pre-set increasing order associated with the first bearer at operation S640, and may be configured to clear buffered data packets associated with the second bearer at operation S650.

Figure 7:
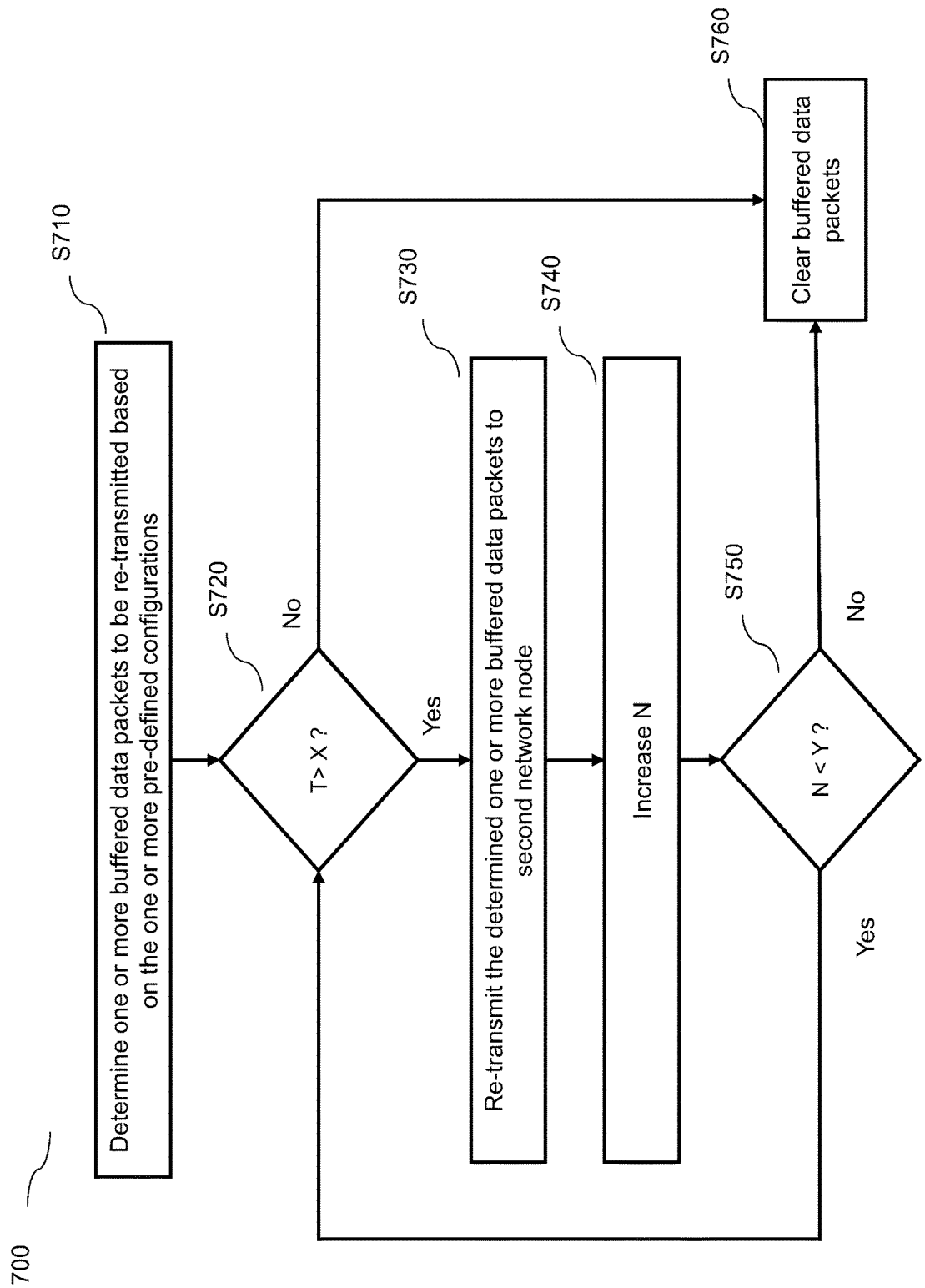
FIG. 7 illustrates yet another example flow diagram of a method for re-transmitting one or more buffered data packets based on one or more pre-defined configurations, according to one or more embodiments.

FIG. 7 illustrates yet another example flow diagram of a method 700 for re-transmitting one or more buffered data packets based on one or more pre-defined configurations, according to one or more embodiments. Method 700 may be a part of operation S430 in FIG. 4, and may be performed by the first network node. Further, method 700 may be a combination of method 500 in FIG. 5 and method 600 in FIG. 6, and the parameters and operations involved therein are similarly applicable in method 700 unless being described otherwise. Further, it is contemplated that one or more operations of method 700 may also be performed as per bearer, in a similar manner as described above in relation to FIG. 4 to FIG. 6.

Referring to FIG. 7, at operation S710, the first network node may be configured to determine one or more buffered data packets to be re-transmitted to the second network node. This operation may be similar to operation S510 in FIG. 5 or operation S610 in FIG. 6, thus redundant descriptions associated therewith may be omitted below for conciseness.

At operation S720, the first network node may be configured to determine whether or not a first condition for re-transmitting the determined one or more buffered data packets is met. Specifically, the first node may be configured to determine whether or not a value of the third parameter (illustrated as "T" in FIG. 7) is greater than a first pre-defined value (illustrated as "X" in FIG. 7). This operation may be similar to operation S520 in FIG. 5, thus redundant descriptions associated therewith may be omitted below for conciseness.

Based on determining that the value of the third parameter is greater than the first pre-defined value, the first network node determines that the first condition for re-transmitting the determined one or more buffered data packets is met, and the process proceeds to operation S730. Otherwise, based on determining that the value of the third parameter is less than or equal to the first pre-defined value, the first network node determines that the first condition for re-transmitting the determined one or more buffered data packets is not met, and the process proceeds to operation S760.

At operation S730, the first network node may be configured to re-transmit the one or more buffered data packets (determined at operation S710) to the second network node, and the process proceeds to operation S740.

At operation S740, the first network node may be configured to increase a value of the fourth parameter (illustrated as "N" in FIG. 7) according to a pre-set increasing order. This operation may be similar to operation S640 in FIG. 6, thus redundant descriptions associated therewith may be omitted below for conciseness. Subsequently, the process proceeds to operation S750.

At operation S750, the first network node may be configured to determine whether or not a second condition for re-transmitting the determined one or more buffered data packets is met. Specifically, the first network node may be configured to determine whether or not the value of the fourth parameter is less than a second pre-defined value (illustrated as "Y" in FIG. 7). This operation may be similar to operation S620 in FIG. 6, thus redundant descriptions associated therewith may be omitted below for conciseness.

Based on determining that the value of the fourth parameter is less than the second pre-defined value, the first network node determines that the second condition for re-transmitting the determined buffered data packets is met, and the process returns to operation S720. Accordingly, the first network node may again be configured to attempt to re-transmit the determined one or more buffered data packets to the second network node, until one of the first condition and second condition is not met.

Otherwise, based on determining that the value of the fourth parameter is greater than or equal to the second pre-defined value, the first network node determines that the second condition for re-transmitting the determined buffered data packets is not met, and the process proceeds to operation S760.

At operation S760, the first network node may be configured to clear the buffered data packets (e.g., remove the buffered data packets from the buffer, etc.). In some embodiments, at operation S760, the first network node may also be configured to reset the value of the third parameter to the initially set value and/or to reset the value of the fourth parameter to the initially set value.

In some embodiments, operation S750 may be performed subsequent to operation S720, before operation S730 and operation S740. Specifically, at operation S720, the first network node may be configured to determine whether or not a first condition for re-transmitting the determined one or more buffered data packets is met. Based on determining that the first condition is met, the process proceeds to operation S750, in which the first network node may be configured to determine whether or not a second condition for re-transmitting the determined buffered data packets is met. Based on determining that the second condition is met, the process proceeds to operation S730, in which the first network node may be configured to re-transmit buffered data packets to the second network node. Otherwise, based on determining that the first condition is not met (in operation S720) or based on determining that the second condition is not met (in operation S750), the process proceeds to operation S760.

FIG. 4 to FIG. 7 described above illustrate embodiments in which the re-transmission of data packets may be configured based on one or more pre-defined configurations. As will be discussed in the following, the re-transmission of data packets may also be dynamically configured by the network node.

Figure 8:
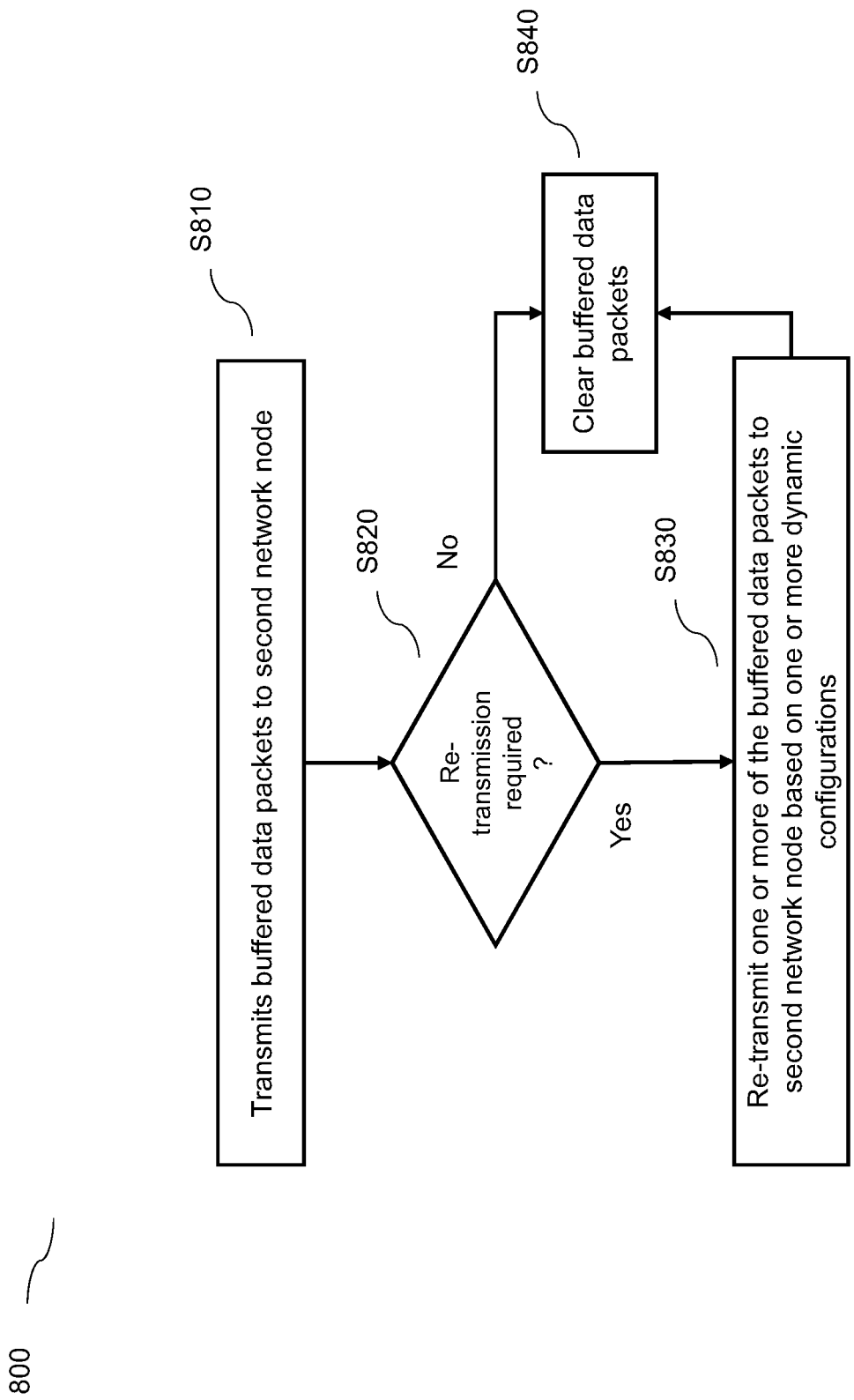
FIG. 8 illustrates an example flow diagram of a method of a data packet recovery operation based on one or more dynamic configurations, according to one or more embodiments.

FIG. 8 illustrates an example flow diagram of a method 800 of a data packet recovery operation based on one or more dynamic configurations, according to one or more embodiments. Operations S810, S820, and S840 may be similar to operations S410, S420, and S440 in FIG. 4, respectively. Thus, redundant descriptions associated with said operations may be omitted below for conciseness.

Referring to FIG. 8, at operation S830, based on determining that a re-transmission of buffered data packets is required, the first network node may be configured to re-transmit one or more of the buffered data packets to the second network node based on one or more dynamic configurations. Specifically, the first network node may be configured to adjust or set (based on information of data packets loss during the transmission of buffered data packets in operation S810) the first parameter, the second parameter, the third parameter, the fourth parameter and/or the fifth parameter, and to configure the re-transmission of one or more buffered data packets based on the adjusted or set parameters. Similarly, it is also contemplated that the first network node may also be configured to adjust or set the first parameter, the second parameter, the third parameter, the fourth parameter and/or the fifth parameter as per bearer, based on the information of data packets loss during the transmission of buffered data packets in the respective bearer. As discussed in the following, the information of lost data packets may be determined in several ways.

Figure 9:
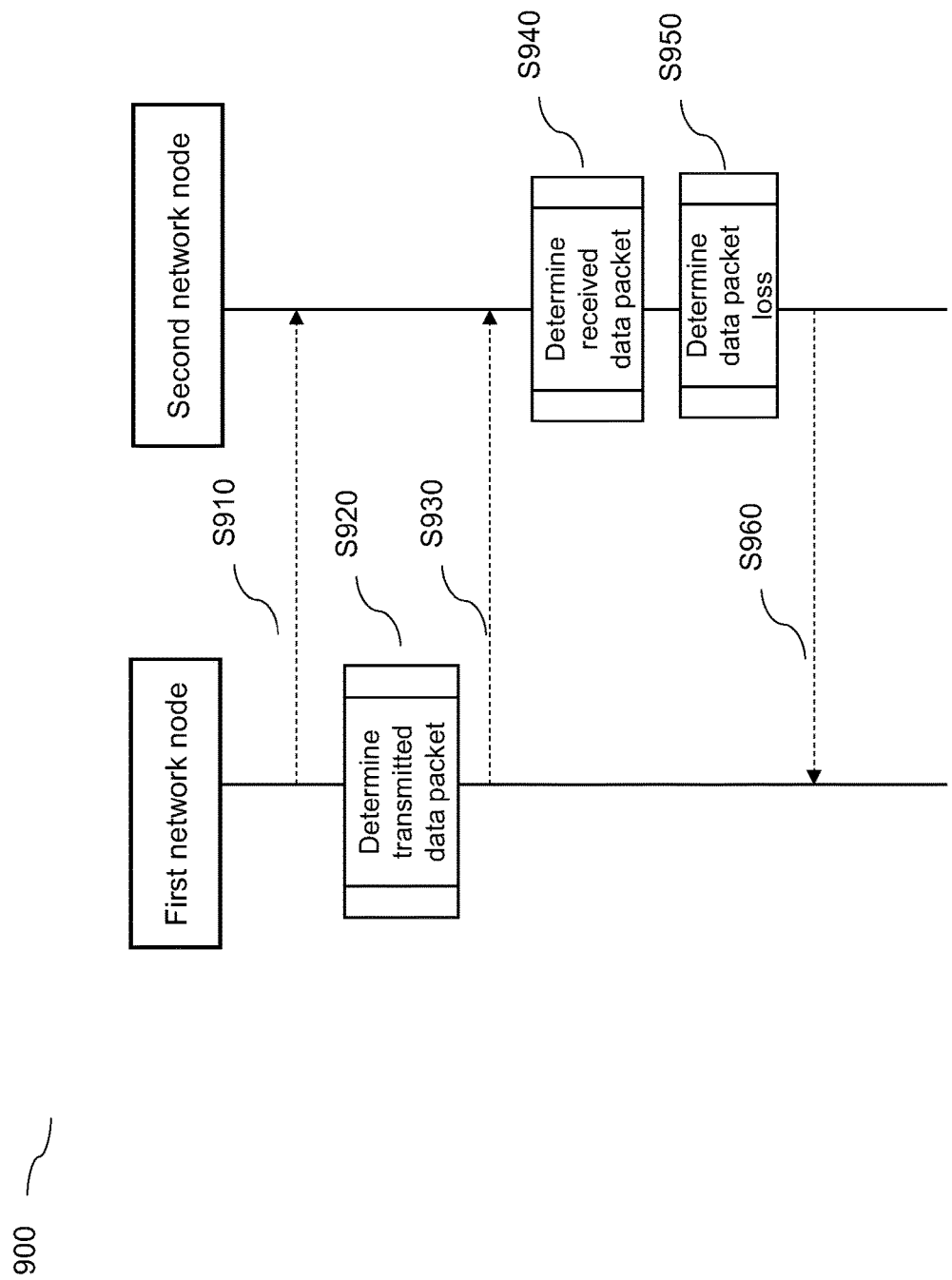
FIG. 9 illustrates an example flow diagram of a method for determining information of data packet loss, according to one or more embodiments.

FIG. 9 illustrates an example flow diagram of a method 900 for determining information of data packets loss, according to one or more embodiments. In this example embodiment, the information of data packet loss may be determined by the second network node.

Referring to FIG. 9, at operation S910, the first network node may be configured to transmit one or more data packets to the second network node. Operation S910 may be similar to operation S810 in FIG. 8.

At operation S920, the first network node may be configured to determine information of transmitted data packet(s) (e.g., one or more data packets transmitted to the second network node at operation S910). Specifically, the first network node may be configured to compute and store the information (e.g., sequence number, packet ID, time stamp, etc.) of each transmitted data packet in a first record file (or in any other suitable storage form). The first network node may be configured to iteratively update the first record file when transmitting each data packet. For instance, the first network node may be configured to determine a total number of data packets transmitted to the second network node, the sequence number of each transmitted data packet, the time stamp of transmission of each data packet, packet ID associated with each transmitted data packet, and any other suitable information associated with the transmitted data packet(s), and may be configured to continuously or periodically store the determined information in the first record file. In some embodiments, the first network node may be configured to determine the information of the transmitted data packet(s) along with one or more PDCP layer operations (e.g., sequence numbering, compression, ciphering, etc.) when transmitting the data packet(s).

At operation S930, the first network node may be configured to transmit the information of the transmitted data packet(s) to the second network node. For instance, the first network node may be configured to continuously or periodically transmit the first record file to the second network node. Further, the first network node may be configured to transmit the information of the transmitted data packet(s) to the second network node when transmitting a subsequent data packet. Furthermore, the first network node may be configured to transmit said information to the second network node via a X2 interface.

At operation S940, the second network node may be configured to determine information of received data packet(s). Specifically, the second network node may be configured to track and store the information (e.g., sequence number, packet ID, time stamp, etc.) of each received data packet in a second record file (or in any other suitable storage form). The second network node may be configured to iteratively update the second record file when receiving each data packet. In some embodiments, the second network node may be configured to determine the information of the received data packet(s) along with one or more PDCP layer operations (e.g., sequence numbering, compression, ciphering, etc.) when receiving the data packet(s).

At operation S950, the second network node may be configured to determine whether or not any data packet that was transmitted from the first network node has been lost. Specifically, the second network node may be configured to compare the information of the transmitted data packet(s) (i.e., information transmitted by the first network node in operation S930) to the information of the received data packet(s) (i.e., information determined by the second network node in operation S940). For instance, the second network node may be configured to compare said information by comparing the first record file to the second record file. Based on the comparison of said information, the second network node may determine whether or not any data packet has been lost during the transmission.

For instance, the information of the transmitted data packet(s) may indicate that 5 data packets have been transmitted by the first network node (e.g., in operation S910), while the information of the received data packet(s) may indicate that only 3 data packets have been received by the second network node. In that case, the second network node may determine that 2 data packets have been lost during the transmission.

In some embodiments, based on determining that one or more data packets have been lost, the second network node may be configured to track and store the data packet loss history in a third record file. Further, the second network node may be configured to determine an estimation of data packet loss based on the third record file. On the other hand, based on determining that no data packet has been lost, the second network node may be configured to include the same information in the third record file.

At operation S960, the second network node may be configured to transmit the result of data packet loss determination (i.e., result of operation S950) to the first network node. Specifically, the second network node may be configured to continuously or periodically transmit the third record file to the first network node. The third record file may comprise the information of the lost data packet(s), if any. Accordingly, the first network node may be configured to receive the result of data packet loss determination (or the third record file) and utilize the same to configure the re-transmission of one or more data packets (to be further discussed below).

Figure 10:
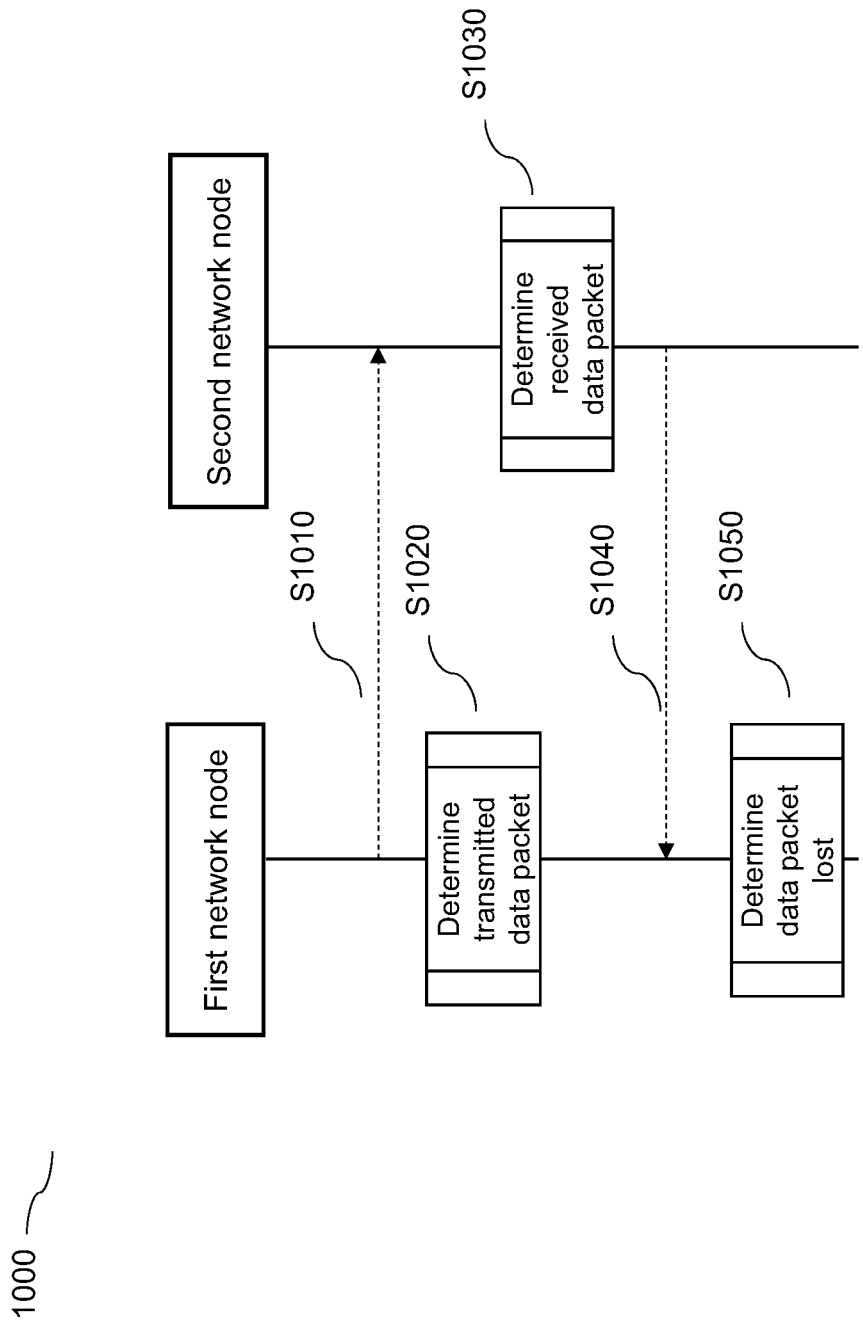
FIG. 10 illustrates another example flow diagram of a method for determining information of data packet loss, according to one or more embodiments.

FIG. 10 illustrates yet another example flow diagram of a method 1000 for determining information of data packet loss, according to one or more embodiments. In this example embodiment, the information of data packet loss may be determined by the first network node.

Referring to FIG. 10, at operation S1010, the first network node may be configured to transmit one or more data packets to the second network node. Operation S1010 may be similar to operation S820 in FIG. 8.

At operation S1020, the first network node may be configured to compute and store the information (e.g., sequence number, packet ID, time stamp, etc.) of each transmitted data packet in a first record file (or in any other suitable storage form). Specifically, the first network node may be configured to iteratively update the first record file when transmitting each data packet. Operation S1020 may be similar to operation S920 in FIG. 9.

At operation S1030, the second network node may be configured to determine information of received data packet(s). Specifically, the second network node may be configured to track and store the information (e.g., sequence number, packet ID, time stamp, etc.) of each received data packet in a second record file (or in any other suitable storage form). Further, the second network node may be configured to iteratively update the second record file when receiving each data packet. Operation S1030 may be similar to operation S940 in FIG. 9.

At operation S1040, the second network node may be configured to transmit the information of the received data packet(s) to the first network node. Specifically, the second network node may be configured to transmit said information to the first network node via an X2 interface. Further, the second network node may be configured to transmit the second record file comprises the information of the received data packet(s) to the first network node.

At operation S1050, the first network node may be configured to determine whether or not any data packet that was transmitted (e.g., transmitted in operation S1010, etc.) has been lost. Specifically, the first network node may be configured to compare the information of the transmitted data packet(s) to the information of the received data packet(s). For instance, the first network node may be configured to compare said information by comparing the first record file to the second record file. Based on the comparison of said information, the first network node may determine whether any data packet has been lost during transmission.

In some embodiments, based on determining that one or more data packets have been lost, the first network node may be configured to track and store the data packet loss history in a third record file. Further, the first network node may be configured to determine an estimation of data packet loss based on the third record file. On the other hand, based on determining that no data packet has been lost, the first network node may be configured to include the same information in the third record file.

It is contemplated that one or more operations in method 900 and/or in method 1000 may be performed as per bearer. For instance one or more of operations S910-S960 and/or one or more operations of S1010-S1050 may be performed simultaneously for a plurality of bearers, may be performed in separate timing for the plurality of bearers, may be performed in a similar manner for the plurality of bearers, and/or may be performed in a different manner for the plurality of bearers.

By way of example, referring to FIG. 9, at operation S910, the first network node may be configured to transmit one or more data packets to the second network node via a first bearer and to transmit one or more data packets to the second network via a second bearer. Accordingly, at operation S920, the first network node may be configured to determine information of data packet(s) transmitted via the first bearer and information of data packet(s) transmitted via the second bearer. Further, at operation S930, the first network node may be configured to transmit to the second network node the information of the data packet(s) transmitted via the first bearer and information of the data packet(s) transmitted via the second bearer. Similarly, at operation S940, the second network node may be configured to determine information of data packet(s) received via the first bearer and information of data packet(s) received via the second bearer. Subsequently, at operation S950, the second network node may be configured to determine whether or not any data packet that was transmitted from the first network node via the first bearer has been lost and to determine whether or not any data packet that was transmitted from the first network node via the second bearer has been lost. Later, at operation S960, the second network node may be configured to transmit to the first network node the result of data packet loss determination for the first bearer and the result of data packet loss determination for the second bearer.

As a further example, referring to FIG. 10, at operation S1010, the first network node may be configured to transmit one or more data packets to the second network node via a first bearer and to transmit one or more data packets to the second network via a second bearer. Accordingly, at operation S1020, the first network node may be configured to determine information of data packet(s) transmitted via the first bearer and information of data packet(s) transmitted via the second bearer. Further, at operation S1030, the second network node may be configured to determine information of data packet(s) received via the first bearer and information of data packet(s) received via the second bearer. Subsequently, at operation S1040, the second network node may be configured to transmit to the first network node the information of the data packet(s) received via the first bearer and the information of the data packet(s) received via the second bearer. Accordingly, at operation S1050, the first network node may be configured to determine whether or not any data packet that was transmitted via the first bearer has been lost and whether or not any data packet that was transmitted via the second bearer has been lost.

As will be further discussed in the below, based on the determining whether or not any data packet has been lost (by performing operations in FIG. 9 or FIG. 10), the first network node may be configured to dynamically configure or adjust the first parameter, the second parameter, the third parameter, the fourth parameter, and/or the fifth parameter, and may then be configured to adjust the re-transmission of data packets in real-time or near real-time based on the dynamically configured parameter(s).

For instance, referring back to FIG. 8, the operations of determining whether or not any data packet has been lost (i.e., operations in FIG. 9 or FIG. 10) may be performed subsequent to operation S810, and the result thereof may be utilized by the first network node in operation S820. Specifically, the first network node may be configured to adjust the first parameter based on said result. For example, based on determining that there is no data packet loss, the first network node may determine that no data re-transmission is required and may thus be configured to set the first parameter to "false" state. On the other hand, based on determining that one or more data packets have been lost, the first network node may determine that data re-transmission is required to recover the lost data packet(s) and may thus be configured to set the first parameter to "true" state. Accordingly, at operation S820, the first network node may be configured to determine whether or not the re-transmission of data packets is required based on the configured first parameter.

Similarly, the first network node may also be configured to dynamically configure or adjust the first parameter, the second parameter, the third parameter, the fourth parameter and/or the fifth parameter as per bearer (based on the information of data packets loss during the transmission of buffered data packets in the respective bearer), and may then be configured to adjust the re-transmission of data packets as per bearer in real-time or near real-time based on the dynamically configured parameter(s).

By way of example, referring still to FIG. 8, at operation S810, the first network node may be configured to transmit one or data packets to the second network node via a first bearer and to transmit one or more data packets to the second network via a second bearer. In this regard, operations in FIG. 9 or FIG. 10 may be performed subsequent to operation S810 so as to determine whether or not any data packet that was transmitted via the first bearer has been lost and whether or not any data packet that was transmitted via the second bearer has been lost.

Subsequently, the first network node may be configured to adjust the first parameter based on the result(s) of operations in FIG. 9 or FIG. 10. For example, based on determining that there is no data packet loss in the transmission of data packet via both bearer, the first network node may determine that no data re-transmission is required for both bearer and may thus be configured to set both of the first configuration of the first parameter associated with the first bearer and the second configuration of the second parameter associated with the second bearer to "false" state. On the other hand, based on determining that one or more data packets have been lost in the transmission of data packet via the first bearer and no data packet loss in the transmission of data packet via the second bearer, the first network node may determine that data re-transmission is required to recover the lost data packet(s) in the transmission of data packet via the first bearer and may thus be configured to set the first configuration of the first parameter to "true" state. Similarly, based on determining that one or more data packets have been lost in the transmission of data packet via the second bearer and no data packet loss in the transmission of data packet via the first bearer, the first network node may determine that data re-transmission is required to recover the lost data packet(s) in the transmission of data packet via the second bearer and may thus be configured to set the second configuration of the first parameter to "true" state. Last but not least, based on determining that one or more data packets have been lost in the transmission of data packet via both bearer, the first network node may be configured to set the first configuration and the second configuration of the first parameter to "true state". Accordingly, at operation S820, the first network node may be configured to determine whether or not the re-transmission of data packets for the first bearer and the second bearer is required based on the configured first parameter.

Figure 11:
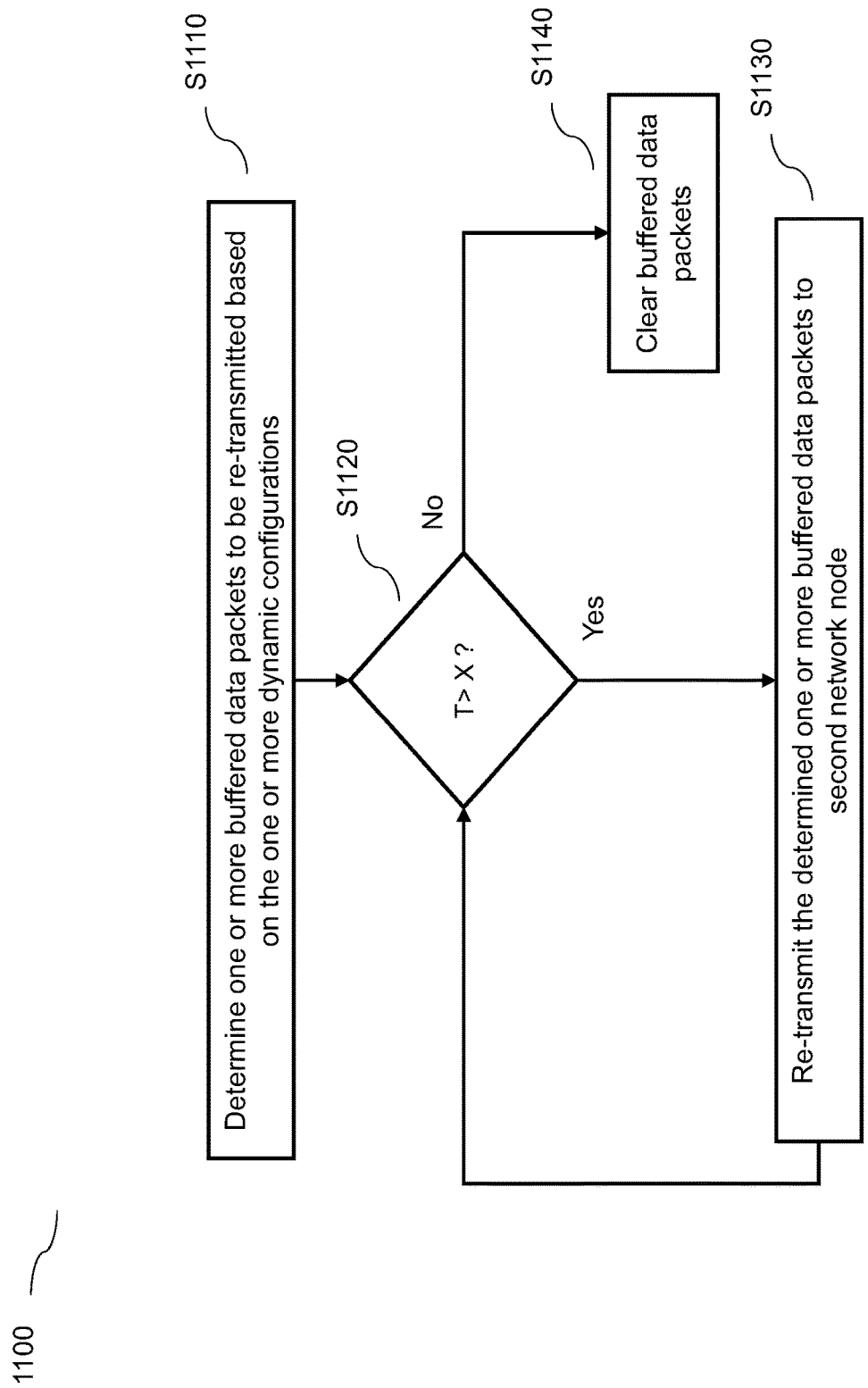
FIG. 11 illustrates an example flow diagram of a method for re-transmitting one or more buffered data packets based on one or more dynamic configurations, according to one or more embodiments.

FIG. 11 illustrates an example flow diagram of a method 1100 for re-transmitting one or more buffered data packets based on one or more dynamic configurations, according to one or more embodiments. Method 1100 may be part of operation S830 in FIG. 8, and one or more operations of method 1100 may be similar to one or more operations of method 500 in FIG. 5 unless being described otherwise.

Referring to FIG. 11, at operation S1110, the first network node may be configured to determine one or more buffered data packets to be re-transmitted to the second network node based on one or more dynamic configuration. Specifically, instead of determining the buffered data packet(s) to be re-transmitted based on the pre-defined value of the second parameter (as described above in relation to S510 in FIG. 5), the first network node may be configured to adjust or configure second parameter based on whether or not any packet has been lost during transmission (i.e., result from operations in FIG. 9 or FIG. 10), and then may be configured to utilize the configured second parameter to determine the one or more buffered data packets to be re-transmitted.

Further, based on determining that one or more data packets have been lost, the first network node may be configured to determine which specific data packet(s) and/or how many data packet(s) have been lost, and may then be configured to adjust the second parameter accordingly. Specifically, the first network node may be configured to determine information (e.g., sequence number, packet ID, etc.) of data packet(s) which have been lost, and may be configured to adjust the value of the second parameter such that the second parameter, when being utilized by the first network node, may cause the first network node to re-transmit the lost data packet(s).

For instance, in an example embodiment which the first network node has transmitted four buffered data packets (e.g., data packet 1, data packet 2, data packet 3, and data packet 4) to the second network node and the first network node determines that data packet 2 has been lost during transmission, the first network node may be configured to set or configure the second parameter to have a value of "3". Accordingly, based on the configured second parameter, the first network node may determine that the last 3 data packets stored in the buffer (i.e., data packet 2, data packet 3, and data packet 4) should be re-transmitted, so as to recover data packet 2. The redundant data packets (e.g., data packet 3 and data packet 4) may be discarded after arriving at the final destination, via operations such as automatic repeat request (ARQ) operation, hybrid automatic repeat request (HARQ) operation, or any other suitable operation.

Alternatively, instead of adjusting the value of the second parameter so that a sequence of data packets (including non-lost data packet) can be re-transmitted, the first network node may be configured to re-transmit only the lost data packet(s). For instance, in the aforementioned example embodiment, based on determining that data packet 2 has been lost, the first network node may be configured to determine the information (e.g., sequence number, packet ID, etc.) of data packet 2, to extract data packet 2 from the buffer based on the determined information, and to re-transmit only data packet 2 to the second network node.

Referring still to FIG. 11, at operation S1120, the first network node may be configured to determine whether or not a condition for re-transmitting the one or more buffered data packets is met. Specifically, the first network node may be configured to determine whether or not a value of the third parameter (illustrated as "T" in FIG. 11) is greater than a pre-defined value (illustrates as "X" in FIG. 11).

In some embodiments, operation S1120 is similar to operation S520 in FIG. 5, at which the value of the third parameter and/or the pre-defined value is pre-configured by the user. Alternatively, the first network node may be configured to adjust or set the third parameter and/or the pre-defined value, based on determining whether or not any packet has been lost (i.e., operations illustrated in FIG. 9 or FIG. 10). For instance, based on determining that one or more data packets have been lost and the number of lost data packets is large (e.g., the number of lost data packets exceeds a threshold value, etc.), the first network node may be configured to increase the value of the third parameter and/or to decrease the pre-defined value, such that longer period of time can be provided to re-transmit the data packets. On the other hand, based on determining that the number of lost data packets is small (e.g., the number of lost data packets is within the threshold value, etc.) or based on determining that no data packet has been lost, the first network node may be configured to decrease the value of the third parameter and/or to increase the pre-defined value, such that the period of time to re-transmit the data packets can be reduced.

In some embodiments, one or more operations in method 1100 may be performed as per bearer, based on one or more dynamically configured or adjusted parameters. For instance one or more of operations S1110-S1140 may be performed simultaneously for a plurality of bearers, may be performed in separate timing for the plurality of bearers, may be performed in a similar manner for the plurality of bearers, and/or may be performed in a different manner for the plurality of bearers. Further, one or more of the associated operations may be similar to the operations described above with reference to FIG. 5, thus redundant descriptions thereof may be omitted below for conciseness.

By way of example, at operation S1110, the first network node may be configured to determine or adjust a first value of the second parameter based on whether or not any packet has been lost during transmission from the first network node to the second network node via the first bearer, and may be configured to determine or adjust a second value of the second parameter based on whether or not any packet has been lost during transmission from the first network node to the second network node via the second bearer. Accordingly, the first network node may be configured to determine (based on the first value of the second parameter) one or more buffered data packets to be re-transmitted to the second network node via the first bearer, and may be configured to determine (based on the second value of the second parameter) the one or more buffered data packets to be re-transmitted to the second network node via the second bearer.

Subsequently, at operation S1120, the first network node may be configured to determine, based on a first value of the third parameter associated with the first bearer, whether or not a condition for re-transmitting the one or more buffered data packets to the second network node via the first bearer is met, and may be configured to determine, based on a second value of the third parameter associated with the second bearer, whether or not a condition for re-transmitting the one or more buffered data packets to the second network node via the second bearer is met. In this regard, that the first value of the third parameter and the second value of the third parameter may be adjusted or configured by the network node based on the information of data packet lost in the transmission via the first bearer and the information of data packet lost in the transmission via the second bearer, respectively.

Figure 12:
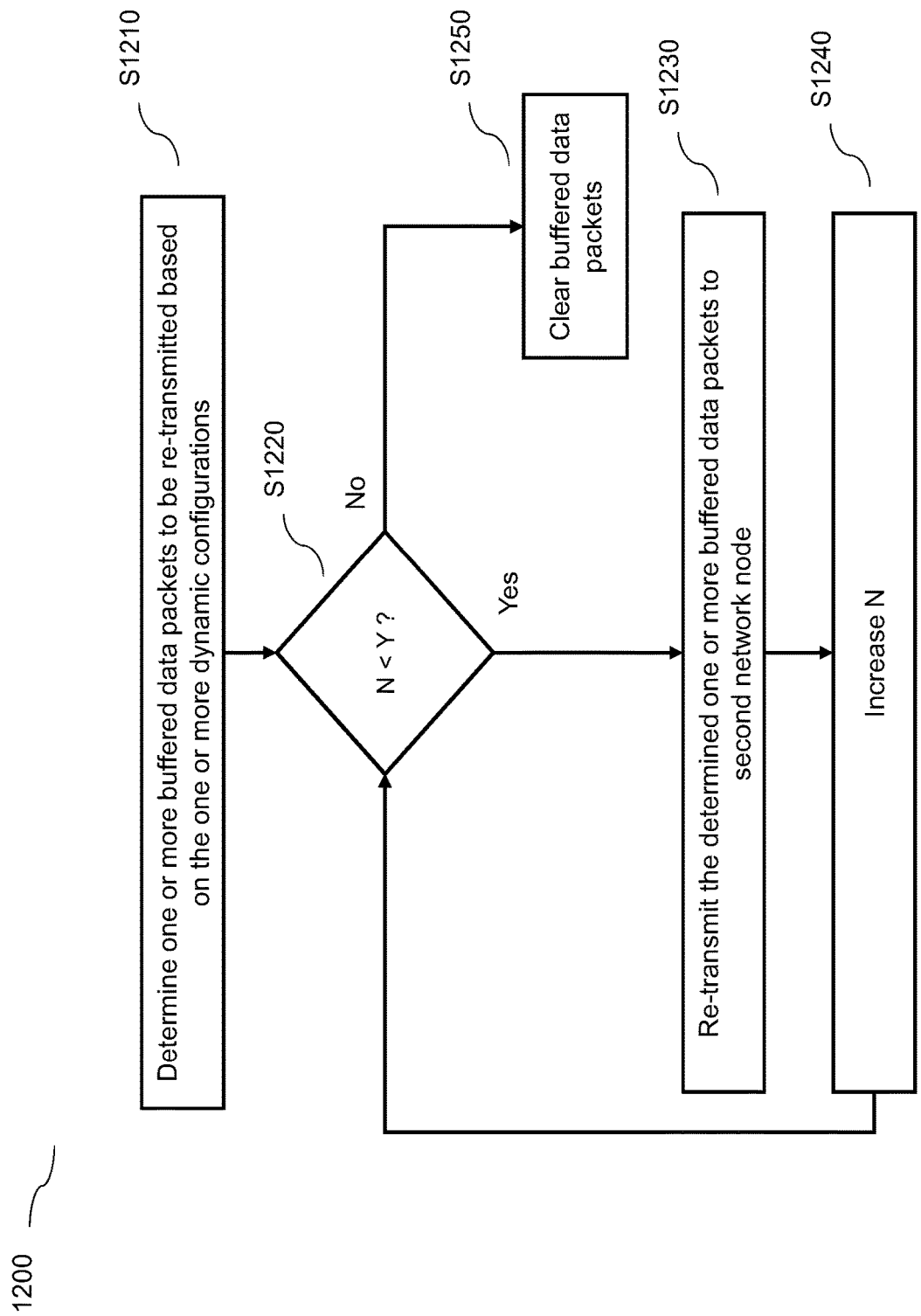
FIG. 12 illustrates another example flow diagram of a method for re-transmitting one or more buffered data packets based on one or more dynamic configurations, according to one or more embodiments.

FIG. 12 illustrates another example flow diagram of a method 1200 for re-transmitting one or more buffered data packets based on one or more dynamic configurations, according to one or more embodiments. Method 1200 may be part of operation S830 in FIG. 8.

Further, one or more operations of method 1200 may be similar to one or more operations of method 600 in FIG. 6 and may be similar to one or more operations of method 1100 of FIG. 11, unless being described otherwise. For instance, method 1200 may begin with operation S1210, which may be similar to operation S1110 in FIG. 11. Further, operations S1230 and S1250 may be similar to operations S630 and S650 in FIG. 6 or may be similar to operations S1130 and S1140 in FIG. 11, respectively. Thus, redundant descriptions associated therewith may be omitted below for conciseness.

Referring to FIG. 12, at operation S1220, the first network node may be configured to determine whether or not a condition for re-transmitting the buffered data packets is met. Specifically, the first network node may be configured to determine whether or not a value of the fourth parameter (illustrated as "N" in FIG. 12) is less than a pre-defined value (illustrates as "Y" in FIG. 11).

In some embodiments, operation S1220 is similar to operation S620 in FIG. 6, at which the value of the fourth parameter and/or the pre-defined value is pre-configured by the network operator. Alternatively, the first network node may be configured to adjust the fourth parameter and/or the pre-defined value, based on determining whether or not any packet has been lost (i.e., operations illustrated in FIG. 9 or FIG. 10). For instance, based on determining that one or more data packets have been lost and the number of lost data packets is large (e.g., the number of lost data packets exceeds a threshold value, etc.), the first network node may be configured to decrease the value of the fourth parameter and/or to increase the pre-defined value, such that more attempt to re-transmit the data packets can be permitted. On the other hand, based on determining that the number of lost data packets is small (e.g., the number of lost data packets is within the threshold value, etc.) or based on determining that no data packet has been lost, the first network node may be configured to increase the value of the fourth parameter and/or to decrease the pre-defined value, such that the less attempt to re-transmit the data packets can be permitted.

Referring still to FIG. 12, at operation S1240, the first network node may be configured to increase the value of the fourth parameter according to the pre-set increasing order. In some embodiments, operation S1240 may be similar to operation S640 in FIG. 6, at which the value of the fourth parameter is increased according to the fixed and pre-set increasing order. Alternatively, the first network node may be configured to adjust the increasing order based on the result of the determining whether or not any packet has been lost (i.e., operations illustrated in FIG. 9 or FIG. 10). For instance, based on determining that one or more data packets have been lost and the number of lost data packets is large, the first network node may be configured to decrease the value of the increasing order, such that the value of fourth parameter may be adjusted to allow more attempt to re-transmit the data packets. On the other hand, based on determining that the number of lost data packets is small or based on determining that no data packet has been lost, the first network node may be configured to increase the value of the increasing order, such that the value of the fourth parameter may be adjusted to allow less attempt to re-transmit the data packets.

In some embodiments, one or more operations in method 1200 may be performed as per bearer, based on one or more dynamically configured or adjusted parameters. For instance one or more of operations S1210-S1250 may be performed simultaneously for a plurality of bearers, may be performed in separate timing for the plurality of bearers, may be performed in a similar manner for the plurality of bearers, and/or may be performed in a different manner for the plurality of bearers. Further, one or more of the associated operations may be similar to the operations described above with reference to FIG. 6 and FIG. 11, thus redundant descriptions thereof may be omitted below for conciseness.

For example, operation S2110 may be similar to operation S1110 in FIG. 6, at which the first network node may be configured to determine (based on a first value of the second parameter configured or adjusted based on whether or not any packet has been lost during transmission from the first network node to the second network node via the first bearer) one or more buffered data packets to be re-transmitted to the second network node via the first bearer, and may be configured to determine (based on a second value of the second parameter configured or adjusted based on whether or not any packet has been lost during transmission from the first network node to the second network node via the second bearer) one or more buffered data packets to be re-transmitted to the second network node via the second bearer.

Further, at operation S1220, the first network node may be configured to determine, based on a first value of the fourth parameter associated with the first bearer, whether or not a condition for re-transmitting the one or more buffered data packets to the second network node via the first bearer is met, and may be configured to determine, based on a second value of the fourth parameter associated with the second bearer, whether or not a condition for re-transmitting the one or more buffered data packets to the second network node via the second bearer is met. In this regard, that the first value of the fourth parameter and the second value of the fourth parameter may be adjusted or configured by the network node based on the information of data packet lost in the transmission via the first bearer and the information of data packet lost in the transmission via the second bearer, respectively.

Figure 13:
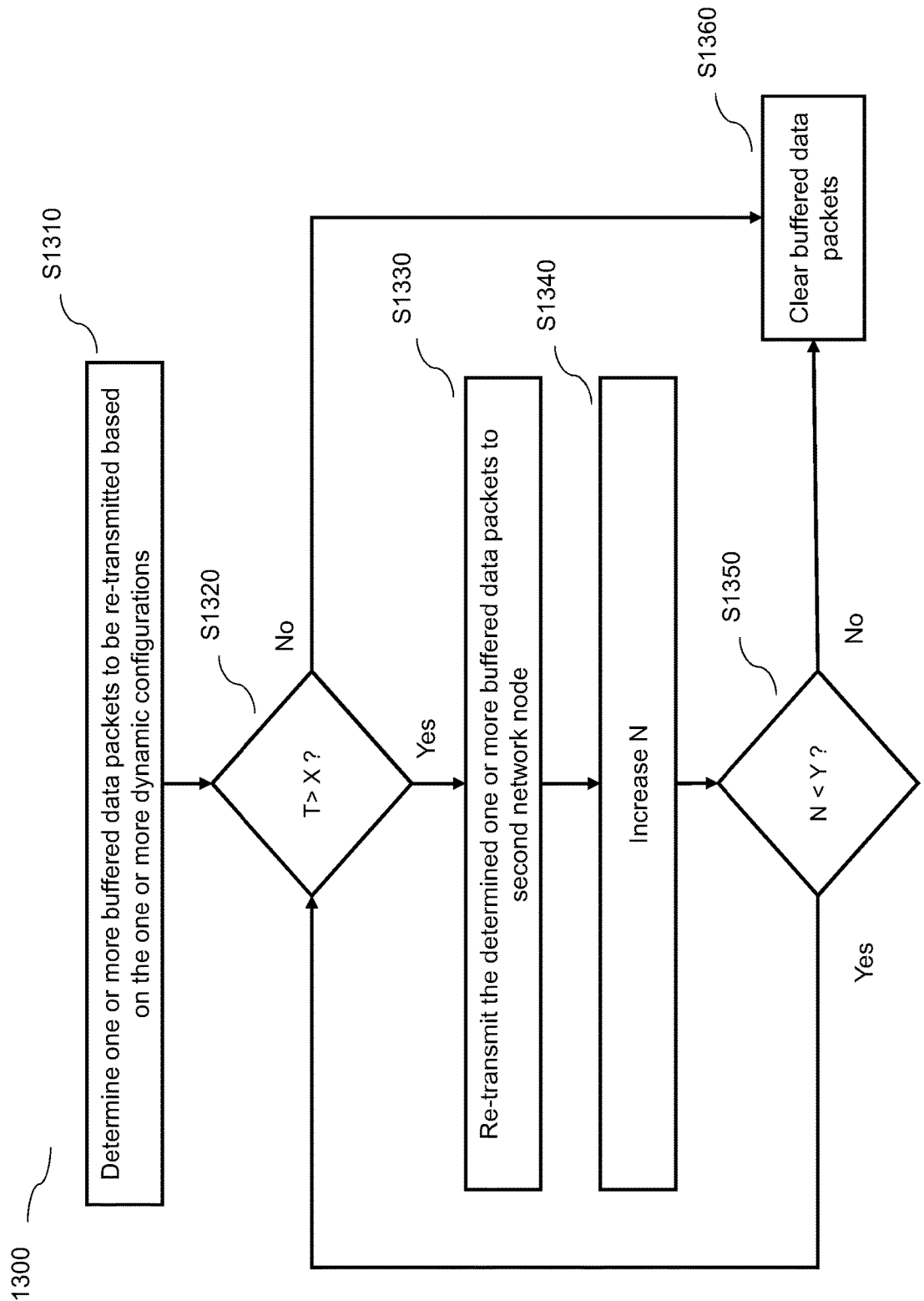
FIG. 13 illustrates yet another example flow diagram of a method for re-transmitting one or more buffered data packets based on one or more dynamic configurations, according to one or more embodiments.

FIG. 13 illustrates yet another example flow diagram of a method 1300 for re-transmitting one or more buffered data packets based on one or more dynamic configurations, according to one or more embodiments. Method 1300 may be a part of operation S830 in FIG. 8, and may be performed by the first network node. Further, method 1300 may be a combination of method 1100 in FIG. 11 and method 1200 in FIG. 12, and the parameters and operations involved therein are similarly applicable in method 1300 unless being described otherwise. Furthermore, one or more operations of method 1300 may be similar to one or more operations of method 700 in FIG. 7, unless being described otherwise. In addition, it is contemplated that one or more operations of method 1300 may also be performed as per bearer, in a similar manner as described above in relation to FIG. 8 to FIG. 12.

Referring to FIG. 13, at operation S1310, the first network node may be configured to determine one or more buffered data packets to be re-transmitted to the second network node based on the dynamically configured second parameter, in a similar manner as described in relation to operation S1110 in FIG. 11.

Further, at operation S1320, the first network node may be configured to determine whether or not a first condition for re-transmitting the buffered data packets is met, and/or to adjust the third parameter (illustrated as "T" in FIG. 13) and/or the first pre-defined value (illustrated as "X" in FIG. 13), in a similar manner as described in relation to operation S1120 in FIG. 11.

Furthermore, at operation S1340, the first network node may be configured to increase the value of the fourth parameter (illustrated as "N" in FIG. 13) according to a pre-set increasing order, and/or to adjust the pre-set increasing order, in a similar manner as described in relation to operation S1240 in FIG. 12.

Further still, at operation S1350, the first network node may be configured to determine whether or not a second condition for re-transmitting the buffered data packets is met, and/or to adjust the value of the fourth parameter and/or the second pre-defined value (illustrated as "Y" in FIG. 13), in a similar manner as described in relation to operation S1220 in FIG. 12.

In some embodiments, operation S1350 may be performed subsequent to operation S1320, before operations S1330 and operation S1340. For instance, at operation S1320, the first network node may be configured to determine whether or not the first condition for re-transmitting the determined buffered data packets is met, and may be configured to adjust the value of the third parameter and/or the first pre-defined value. Based on determining that the first condition is met, the process proceeds to operation S1350, at which the first network node may be configured to determine whether or not the second condition for re-transmitting the determined buffered data packets is met, and may be configured to adjust the value of the fourth parameter and/or the second predefined value. Based on determining that the second condition is met, the process proceeds to operation S330, at which the first network node may be configured to re-transmits buffered data packets to the second network node. Otherwise, based on determining that the first condition is not met (in operation S1320) or based on determining that the second condition is not met (in operation S1350), the process proceeds to operation S1360.

Figure 14:
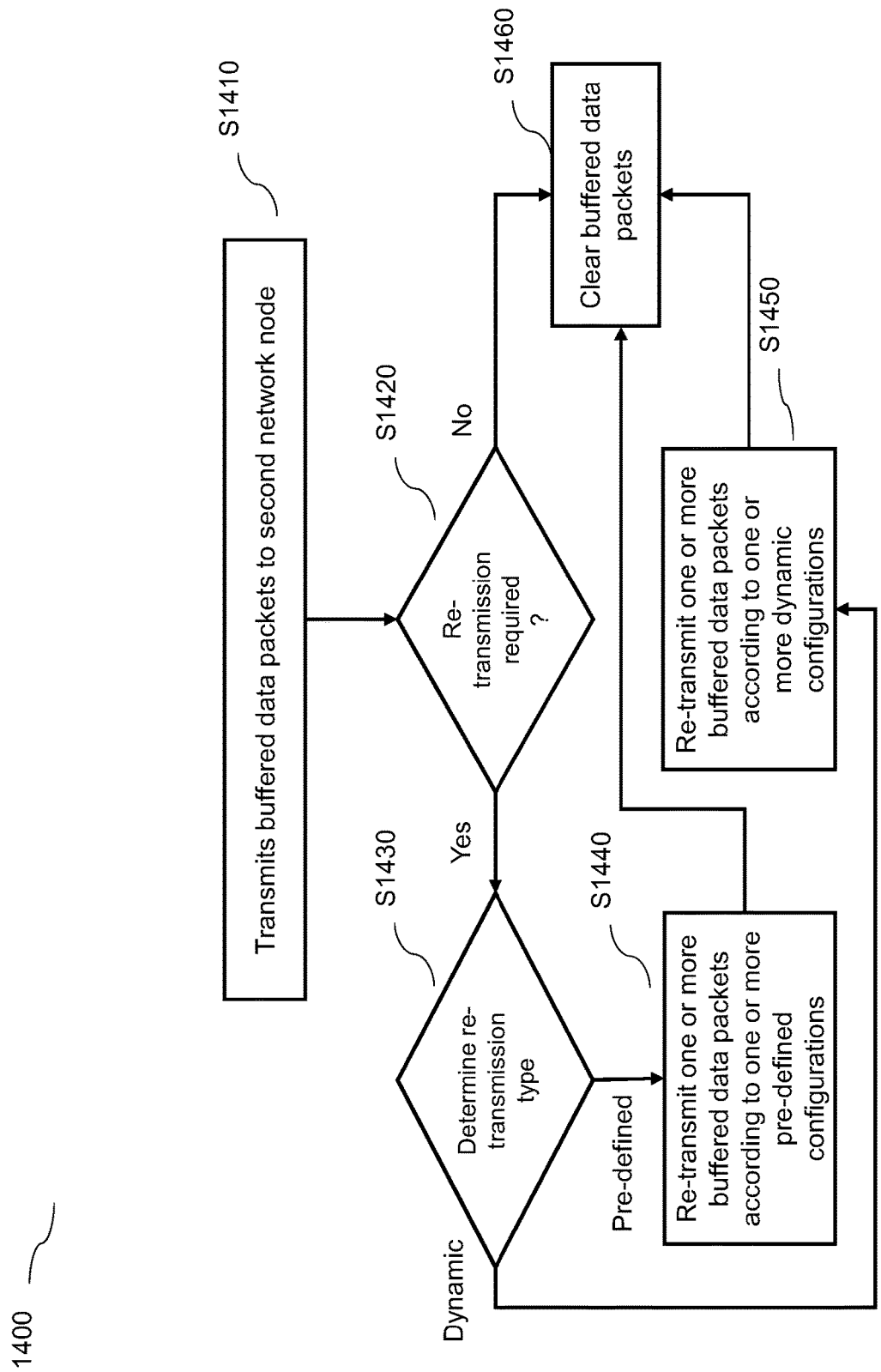
FIG. 14 illustrates another example flow diagram of a method of a data packet recovery operation, according to one or more embodiments.

FIG. 14 illustrates another example flow diagram of a method 1400 of a data packet recovery operation, according to one or more embodiments. Method 1400 may be a combination of method 400 of FIG. 4 and method 800 of FIG. 8. In this example embodiment, one or more buffered data packets may be re-transmitted based on one or more pre-defined configurations, one or more dynamic configurations, or a combination thereof. Further, it is contemplated that one or more operations of method 1400 may also be performed as per bearer, in a similar manner as described above with reference to FIG. 4 to FIG. 13.

Referring to FIG. 14, at operation S1410, the first network node may be configured to transmit buffered data packets to the second network node, in a similar manner as described in relation to operation S810 in FIG. 8. Subsequently, at operation S1420, the first network node may be configured to determine whether or not a re-transmission of buffered data packets is required based on pre-configured first parameter (in a similar manner as described in relation to operation S420 in FIG. 4) or based on or dynamically configured first parameter (in a similar manner as described in relation to operation S820 in FIG. 8).

Based on determining that the re-transmission of buffered data packets is not required, the process proceeds to operation S1460, which may be similar to operation S440 in FIG. 4 or operation S840 in FIG. 8.

At operation S1430, based on determining that the re-transmission of buffered data packets is required, the first network node may be configured to determine a type of re-transmission. Specifically, the first network node may be configured to determine the type of re-transmission based on the fifth parameter, and based on determining that the fifth parameter indicates a type of configuration, the first network node may be configured to determine that the re-transmission of the buffered data packets should be performed according to the type of configuration. For instance, the fifth parameter may indicates a first type of configuration (e.g., "default", "pre-defined", etc.) for indicating that re-transmission based on one or more pre-defined configurations is required or is enabled. Similarly, the fifth parameter may indicates a second type of configuration (e.g., "non-default", "dynamic", etc.) for indicating that retransmission based on one or more dynamic configurations is required or is enabled. Accordingly, based on the fifth parameter, the first network node may determine whether to re-transmit the one or more buffered data packets according to one or more pre-defined configurations or to re-transmit the one or more buffered data packets according to one or more dynamic configurations.

In some embodiment, the fifth parameter may be pre-set by the network operator before the node switching operation or may be configurable by the network operator as per requirement. In some embodiments, the fifth parameter may be periodically or dynamically configured and/or adjusted by the first network node. Specifically, the first network node may be configured to configure or set the fifth parameter to be "non-default" or "dynamic", based on determining that re-transmitting the buffered data packets according to one or more dynamic configurations will be more effective and/or efficient (e.g., the number of data packet lost is large and the pre-defined configuration of the second, third, and/or fourth parameters may not be sufficient for recovering the lost data packets, the number of data packet lost is small and the pre-defined configuration of the second, third, and/or fourth parameters may be too excessive and may cause wastage of network resources, etc.). Similarly, the first network node may be configured to set the fifth parameter to be "default" or "pre-defined", based on determining that re-transmitting the buffered data packets according to pre-defined configuration will be more effective and/or efficient (e.g., the pre-defined configuration of the second, third, and/or fourth parameters may be sufficient to effectively or efficiently recover the lost data packets, etc.).

In addition, the first network node may be configured to adjust or set the fifth parameter as per bearer. For instance, the first network node may be configured to set or adjust a first configuration of the fifth parameter for a first bearer (e.g., based on the information of data packet lost in the transmission via the first bearer, etc.), and may be configured to set or adjust a second configuration of the fifth parameter for a second bearer (e.g., based on the information of data packet lost in the transmission via the second, etc.). By way of example, the first network node may be configured to adjust or set the first configuration of the fifth parameter to be "non-default" or "dynamic", and may be configured to adjust or set the second configuration of the fifth parameter to be "default" or "pre-defined", in a similar manner as described above.

Based on determining that re-transmission of buffered data packets according to pre-defined configuration is require or is enabled, the process proceeds to operation S1440, in which the first network node may be configured to re-transmit the one or more buffered data packets according to one or more pre-defined configurations. Operation S1440 may be similar to the operations described in relation to FIG. 5 to FIG. 7, thus the detailed descriptions thereof are omitted for conciseness. Subsequently, the process proceeds to operation S1460, which may be similar to operation S440 in FIG. 4, operation S540 in FIG. 5, operation S650 in FIG. 6, or operation S760 in FIG. 7.

On the other hand, based on determining that re-transmission of buffered data packets according to dynamic configuration is require or is enabled, the process proceeds to operation S1450, in which the first network node may be configured to re-transmit the one or more buffered data packets according to one or more dynamic configurations. Operation S1440 may be similar to the operations described in relation to FIG. 8 to FIG. 14, thus the detailed descriptions thereof are omitted for conciseness. Subsequently, the process proceeds to operation S1460.

It is contemplated that the "first network node" and the "second network node" described hereinabove in relation to FIG. 4 to FIG. 14 may refer to a source node and a target node, respectively. In that case, one or more operations in FIG. 4 to FIG. 14 may be performed to recover one or more data packets lost during the transmission of said data packets from the source node to the target node (due to weak interface or connection between the source node and the target node, etc.). Alternatively, the "first network node" and the "second network node" may refer to a target node and a UE, respectively. In that case, one or more operations in FIG. 4 to FIG. 14 may be performed to recover one or more data packets lost during the transmission of said data packets from the target node to the UE (due to poor channel between the target node and the UE, etc.).

Figure 15:
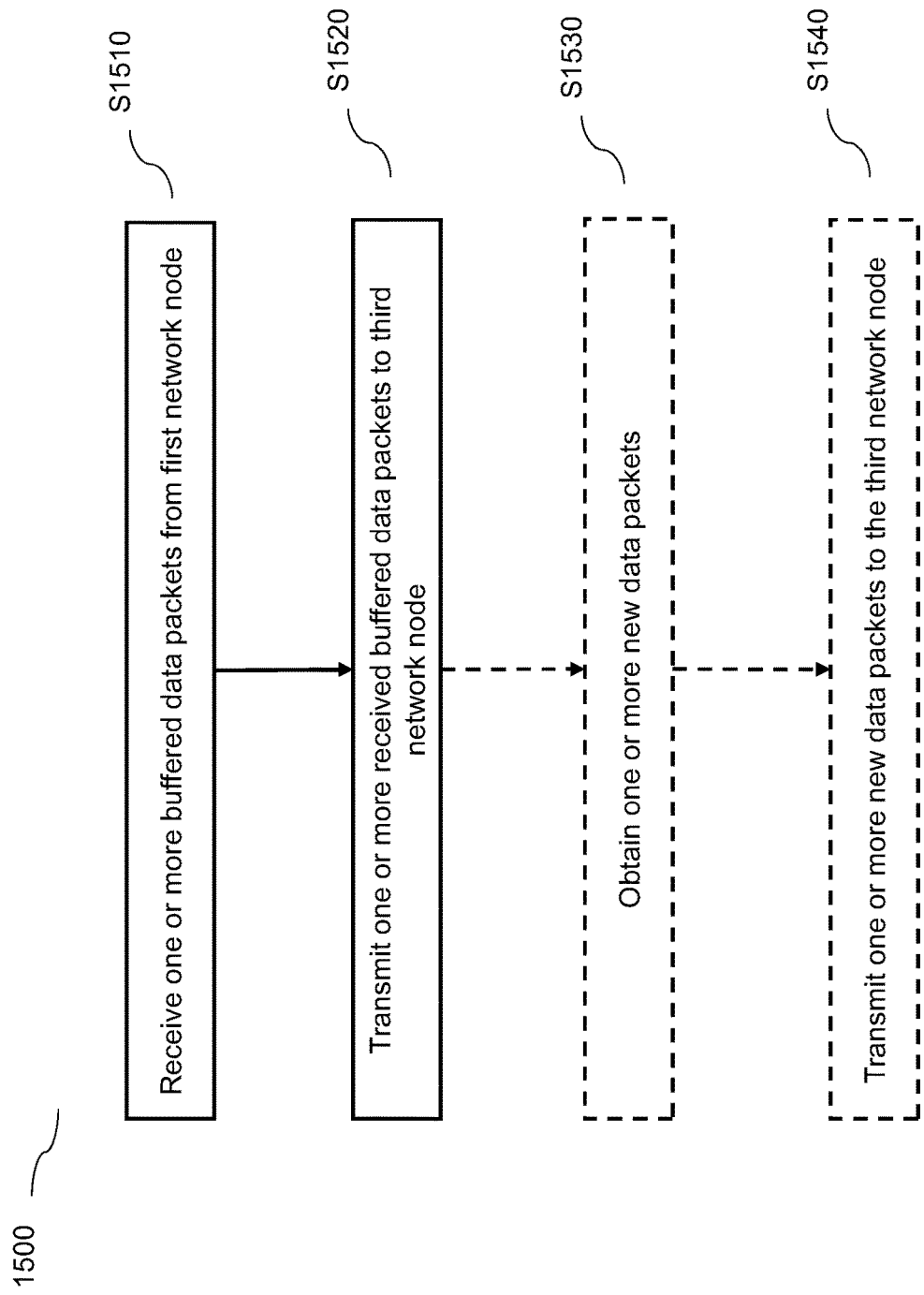
FIG. 15. illustrates an example flow diagram of a method for transmitting one or more data packets, according to one or more embodiments.

FIG. 15. illustrates an example flow diagram of a method 1500 for transmitting one or more data packets, according to one or more embodiments. Method 1500 may be performed by the second network node, in response to the methods described in one or more of FIG. 4 to FIG. 14.

Referring to FIG. 15, at operation S1510, the second network node may be configured to receive one or more buffered data packets from the first network node. In some embodiments, the received one or more buffered data packets are the one or more buffered data packets transmitted by the first network node at operation S410 in FIG. 4, at operation S810 in FIG. 8, or at operation S1410 in FIG. 14 (referred to as "first buffered data packets" hereinafter). In some embodiments, the received one or more buffered data packets are the one or more buffered data packets re-transmitted by the first network node at operation S430 in FIG. 4, at operation S530 in FIG. 5, at operation S630 in FIG. 6, or at operation S730 in FIG. 7, at operation S830 in FIG. 8, at operation S1130 in FIG. 11, at operation S1230 in FIG. 12, at operation S1330 in FIG. 13, at operation S1440 in FIG. 14, or at operation S1450 in FIG. 14 (referred to as "second buffered data packets" hereinafter).

In some embodiments, the second network node may be configured to store one or both of the first buffered data packets and second buffered data packets in a storage medium (e.g., a buffer, an internal memory storage, an external memory storage, etc.). In some embodiments, the second network node is configured to store the first buffered data packets and/or the second buffered data packets in a sequential manner, according to the timing of receiving said buffered data packets (e.g., data packets received earlier will be stored first and be assigned a lower sequence number, etc.), according to quality of service class identifier (QCI) values, according to the size of the data packets, and/or according to any other suitable parameters.

At operation S1520, the second network node may be configured to transmit the received one or more buffered data packets (i.e., the first buffered data packets and/or the second buffered data packets) to a third network node. In some embodiments, the second network node may be a target node and the third network node may be a user equipment (UE) which may be the final destination of the buffered data packets. In some embodiments, the third network node may be a third base station (e.g., eNodeB, gNodeB, etc.), a SGW, a PGW, or any other suitable network node communicatively coupling the second network node to the final destination of the buffered data packets.

In some embodiments, the second network node may be configured to transmit the first buffered data packets to the third network node at a first period of time, and to transmits the second buffered data packets to the third network node at a second period of time. In some embodiments, the first period of time is prior to the second period of time (e.g., the first buffered data packets are transmitted before the second buffered data packets). In some embodiments, the first period of time is later than the second period of time (e.g., the first buffered data packets are transmitted after the second buffered data packets). In some embodiments, the first period of time is the same as the second period of time (e.g., the first buffered data packets and the second buffered data packets are transmitted at the same time), or may have some overlap.

In some embodiments, the second network node may be configured to receive the first buffered data packets from the first network node and may be configured to transmit the first buffered data packets to the third network node thereafter. Subsequently, the second network node may be configured to receive the second buffered data packets from the first network node and to re-transmit the second buffered data packets to the third network node.

In some embodiments, the second network node may be configured to transmit the first buffered data packets and/or the second buffered data packets along with an ARQ ID, a HARQ ID, or any other suitable parameters which may be utilized by the third network node to discard any redundant data packet.

At optional operation S1530, the second network node may be configured to obtain one or more new data packets (e.g., data packets subsequent to the buffered data packets, data packets defining another information, etc.). In some embodiments, the second network node may be configured to establish a communication with a network (e.g., a network to which the first network node is originally connected, a network from which the first network node obtained the buffered data packets, a network in which the one or more new data packets hosted, etc.) and to obtain the one or more new data packets from the network. Subsequently, at optional operation S1540, the second network node may be configured to transmit the one or more new data packets to the third network node.

It is contemplated that one or more operations in method 1500 may be performed as per bearer. Further, it is apparent that the operations described hereinabove may be performed in any other possible orders without departing from the scope of the present disclosure.

Example embodiments of the present disclosures provide a system and method for efficiently and effectively recovering any potential data packets loss during the node switching operation. Specifically, example embodiments of the present disclosures allow automatic re-transmission of data packets during the node switching operation, before a data packets loss is notified. Accordingly, any data packet which may be potentially lost during the node switching operation can be timely recovered, and the rate of data packet losses can thereby be significantly reduced or be avoided.

Further, example embodiments of the present disclosures provide a system and method for automatically configure the re-transmission of data packets according to the real-time or near real-time condition. Specifically, example embodiments of the present disclosures provide a system and method which automatically determine whether or not a re-transmission of data packets is require and automatically select the most suitable configuration for re-transmitting the data packets, according to the real-time or near real-time network condition (e.g., required network traffic for re-transmitting the data packets, available network resources, etc.)

Furthermore, in example embodiments of the present disclosures, the data packets to be re-transmitted are stored in a buffer of the source node (e.g., the first network node). Specifically, unlike the system and method in the related art which simply clears the stored data packets data from the buffer after transmission to the target node (e.g., the second network node), the system and method of the present disclosures may retain the buffered data packets to be re-transmitted in the buffer (according to one or more pre-defined parameters or according to one or more dynamically configured parameters), based on determining that the re-transmission of buffered data packets is required. Accordingly, instead of re-obtaining the data packet(s) from a network in the related art, in the present disclosures the source node may efficiently re-transmit one or more buffered data packets which in turns increase the efficiency in recovering the lost data packet(s). Further still, in the present disclosures, the source node may be configured to repeat the data packets retransmission process (based on one or more pre-defined parameters or based on one or more dynamically configured parameters). Accordingly, the example embodiments of the present disclosure efficiently and effectively reduce the data packet loss during node switching operation, which may be particularly helpful for services which require a lossless and seamless node switching operation.

Figure 16:
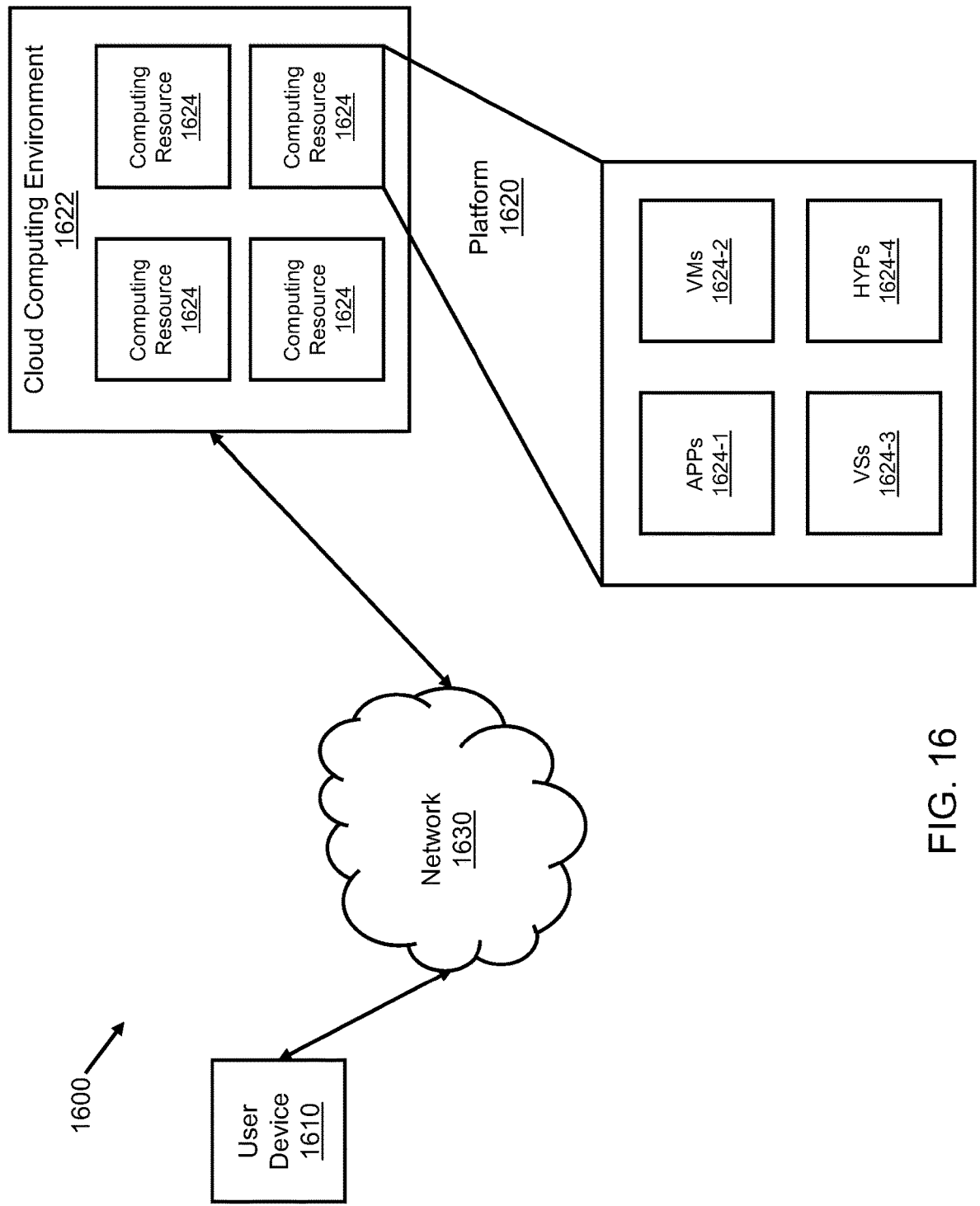
FIG. 16 is a diagram of an example environment in which systems and/or methods, described herein, may be implemented.

FIG. 16 is a diagram of an example environment 1600 in which systems and/or methods, described herein, may be implemented. As shown in FIG. 16, environment 1600 may include a user device 1610, a platform 1620, and a network 1630. Devices of environment 1600 may interconnect via wired connections, wireless connections, or a combination of wired and wireless connections. In embodiments, any of the functions and operations described with reference to FIGS. 4 through 15 above may be performed by any combination of elements illustrated in FIG. 16.

User device 1610 includes one or more devices capable of receiving, generating, storing, processing, and/or providing information associated with platform 1620. For example, user device 1610 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), a SIM-based device, or a similar device. In some implementations, user device 1610 may receive information from and/or transmit information to platform 1620.

Platform 1620 includes one or more devices capable of receiving, generating, storing, processing, and/or providing information. In some implementations, platform 1620 may include a cloud server or a group of cloud servers. In some implementations, platform 1620 may be designed to be modular such that certain software components may be swapped in or out depending on a particular need. As such, platform 1620 may be easily and/or quickly reconfigured for different uses.

In some implementations, as shown, platform 1620 may be hosted in cloud computing environment 1622. Notably, while implementations described herein describe platform 1620 as being hosted in cloud computing environment 1622, in some implementations, platform 1620 may not be cloud-based (i.e., may be implemented outside of a cloud computing environment) or may be partially cloud-based.

Cloud computing environment 1622 includes an environment that hosts platform 1620. Cloud computing environment 1622 may provide computation, software, data access, storage, etc., services that do not require end-user (e.g., user device 1610) knowledge of a physical location and configuration of system(s) and/or device(s) that hosts platform 1620. As shown, cloud computing environment 1622 may include a group of computing resources 1624 (referred to collectively as "computing resources 1624" and individually as "computing resource 1624").

Computing resource 1624 includes one or more personal computers, a cluster of computing devices, workstation computers, server devices, or other types of computation and/or communication devices. In some implementations, computing resource 1624 may host platform 1620. The cloud resources may include compute instances executing in computing resource 1624, storage devices provided in computing resource 1624, data transfer devices provided by computing resource 1624, etc. In some implementations, computing resource 1624 may communicate with other computing resources 1624 via wired connections, wireless connections, or a combination of wired and wireless connections.

As further shown in FIG. 16, computing resource 1624 includes a group of cloud resources, such as one or more applications ("APPs") 1624-1, one or more virtual machines ("VMs") 1624-2, virtualized storage ("VSs") 1624-3, one or more hypervisors ("HYPs") 1624-4, or the like.

Application 1624-1 includes one or more software applications that may be provided to or accessed by user device 1610. Application 1624-1 may eliminate a need to install and execute the software applications on user device 1610. For example, application 1624-1 may include software associated with platform 1620 and/or any other software capable of being provided via cloud computing environment 1622. In some implementations, one application 1624-1 may send/receive information to/from one or more other applications 1624-1, via virtual machine 1624-2.

Virtual machine 1624-2 includes a software implementation of a machine (e.g., a computer) that executes programs like a physical machine. Virtual machine 1624-2 may be either a system virtual machine or a process virtual machine, depending upon use and degree of correspondence to any real machine by virtual machine 1624-2. A system virtual machine may provide a complete system platform that supports execution of a complete operating system ("OS"). A process virtual machine may execute a single program, and may support a single process. In some implementations, virtual machine 1624-2 may execute on behalf of a user (e.g., user device 1610), and may manage infrastructure of cloud computing environment 1622, such as data management, synchronization, or long-duration data transfers.

Virtualized storage 1624-3 includes one or more storage systems and/or one or more devices that use virtualization techniques within the storage systems or devices of computing resource 1624. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1624-4 may provide hardware virtualization techniques that allow multiple operating systems (e.g., "guest operating systems") to execute concurrently on a host computer, such as computing resource 1624. Hypervisor 1624-4 may present a virtual operating platform to the guest operating systems, and may manage the execution of the guest operating systems. Multiple instances of a variety of operating systems may share virtualized hardware resources.

Network 1630 includes one or more wired and/or wireless networks. For example, network 1630 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 16 are provided as an example. In practice, there may be additional devices and/or networks, fewer devices and/or networks, different devices and/or networks, or differently arranged devices and/or networks than those shown in FIG. 16. Furthermore, two or more devices shown in FIG. 16 may be implemented within a single device, or a single device shown in FIG. 16 may be implemented as multiple, distributed devices. Additionally, or alternatively, a set of devices (e.g., one or more devices) of environment 1600 may perform one or more functions described as being performed by another set of devices of environment 1600.

Figure 17:
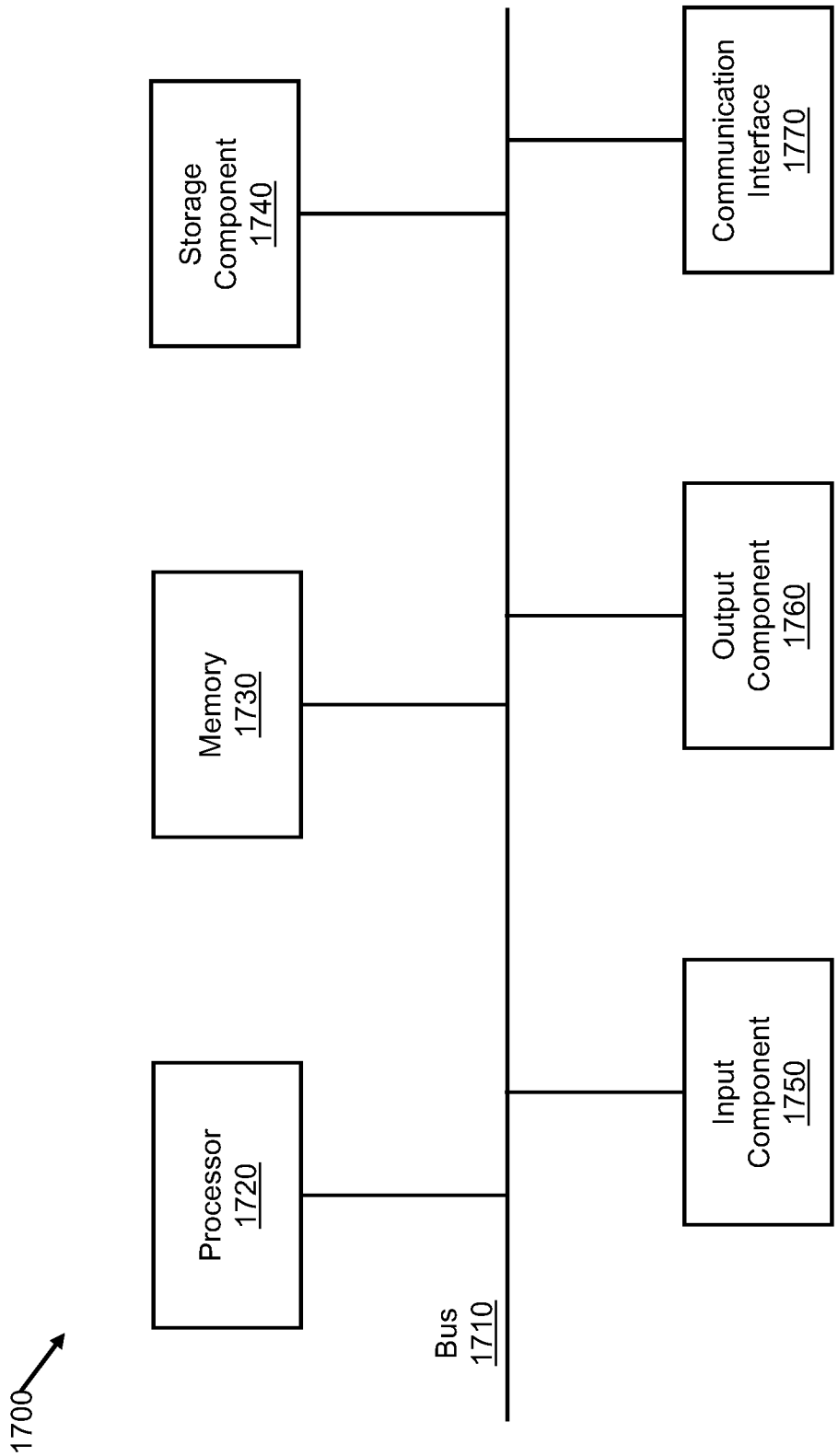
FIG. 17 is a diagram of example components of a device, according to one or more embodiments.

FIG. 17 is a diagram of example components of a device 1700. Device 1700 may correspond to first network node, second network node, and/or third network node (described above with reference to FIG. 4 to FIG. 15). Further, device 1700 may corresponds to user device 1610 and/or platform 1620 (illustrated in FIG. 16). As shown in FIG. 17, device 1700 may include a bus 1710, a processor 1720, a memory 1730, a storage component 1740, an input component 1750, an output component 1760, and a communication interface 1770.

Bus 1710 includes a component that permits communication among the components of device 1700. Processor 1720 may be implemented in hardware, firmware, or a combination of hardware and software. Processor 1720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1720 includes one or more processors capable of being programmed to perform a function. Memory 1730 includes a random access memory (RAM), a read only memory (ROM), and/or another type of dynamic or static storage device (e.g., a flash memory, a magnetic memory, and/or an optical memory) that stores information and/or instructions for use by processor 1720.

Storage component 1740 stores information and/or software related to the operation and use of device 1700. For example, storage component 1740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1750 includes a component that permits device 1700 to receive information, such as via user input (e.g., a touch screen display, a keyboard, a keypad, a mouse, a button, a switch, and/or a microphone). Additionally, or alternatively, input component 1750 may include a sensor for sensing information (e.g., a global positioning system (GPS) component, an accelerometer, a gyroscope, and/or an actuator). Output component 1060 includes a component that provides output information from device 1700 (e.g., a display, a speaker, and/or one or more light-emitting diodes (LEDs)).

Communication interface 1770 includes a transceiver-like component (e.g., a transceiver and/or a separate receiver and transmitter) that enables device 1700 to communicate with other devices, such as via a wired connection, a wireless connection, or a combination of wired and wireless connections. Communication interface 1770 may permit device 1700 to receive information from another device and/or provide information to another device. For example, communication interface 1770 may include an Ethernet interface, an optical interface, a coaxial interface, an infrared interface, a radio frequency (RF) interface, a universal serial bus (USB) interface, a Wi-Fi interface, a cellular network interface, or the like.

Device 1700 may perform one or more processes described herein. Device 1700 may perform these processes in response to processor 1720 executing software instructions stored by a non-transitory computer-readable medium, such as memory 1730 and/or storage component 1740. A computer-readable medium is defined herein as a non-transitory memory device. A memory device includes memory space within a single physical storage device or memory space spread across multiple physical storage devices.

Software instructions may be read into memory 1730 and/or storage component 1740 from another computer-readable medium or from another device via communication interface 1770. When executed, software instructions stored in memory 1730 and/or storage component 1740 may cause processor 1720 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 17 are provided as an example. In practice, device 1700 may include additional components, fewer components, different components, or differently arranged components than those shown in FIG. 17. Additionally, or alternatively, a set of components (e.g., one or more components) of device 1700 may perform one or more functions described as being performed by another set of components of device 1700.

In some embodiments, any one of the operations or processes of FIG. 4 through 15 may be implemented by or using any one of the elements illustrated in FIG. 16 and FIG. 17.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system comprising:
   a first network node comprising:
      a memory storing instructions; and
      at least one processor configured to execute the instructions to:
         transmit one or more data packets stored in a buffer to a second network node during a handover operation;
         determine whether or not a re-transmission of the one or more data packets is required;
         determine a type of the re-transmission, based on determining that the re-transmission is required;
         re-transmit the one or more data packets based on the determined type of the re-transmission, the type of re-transmission being determined from among a first type using predefined configurations for one or more parameters, and a second type using dynamic configurations for the one or more parameters, the predefined configurations being values of the one or more parameters that are predefined prior to the handover operation, and the dynamic configurations being values of the one or more parameters that are defined or adjusted by the first network node during the handover operation; and
         clear the one or more data packets from the buffer, based on determining that the re-transmission is not required,
      wherein the first network node is a source base station of the handover operation, and the second network node is a target base station of the handover operation.

2. The system as claimed in claim 1, wherein the at least one processor of the first network node is further configured to execute the instructions to:
   determine whether or not one or more data packets have been lost during transmission; and
   based on determining that one or more data packets have been lost during transmission, determine information of the lost one or more data packets.

3. The system as claimed in claim 2, wherein the type of the re-transmission is a re-transmission based on one or more dynamic configurations.

4. The system as claimed in claim 3, wherein the at least one processor of the first network node is configured to execute the instructions to determine whether or not the re-transmission of the one or more data packets is required by:
   configuring a first parameter based on the determined information of the lost one or more data packets;
   determining a state of the configured first parameter;
   based on determining that the configured first parameter comprises a first state, determining that the re-transmission of the one or more data packets is required; and
   based on determining that the configured first parameter comprises a second state, determining that the re-transmission of the one or more data packets is not required.

5. The system as claimed in claim 3, wherein the at least one processor of the first network node is configured to execute the instructions to re-transmit the one or more data packets by:
   determining one or more data packets to be re-transmitted;
   determining whether or not a condition for re-transmitting the determined one or more data packets is met; and
   based on determining that the condition is met, re-transmitting the determined one or more data packets to the second network node.

6. The system as claimed in claim 5, wherein the at least one processor of the first network node is configured to execute the instructions to determine the one or more data packets to be re-transmitted by:
   configuring a second parameter based on the determined information of the lost one or more data packets; and
   determining the one or more data packets to be re-transmitted based on the configured second parameter.

7. The system as claimed in claim 5, wherein the at least one processor of the first network node is configured to execute the instructions to determine whether or not the condition for re-transmitting the determined one or more data packets is met by:
   configuring a third parameter based on the determined information of the lost one or more data packets;
   determining whether or not the configured third parameter is greater than a first pre-defined value;
   based on determining that the configured third parameter is greater than the first pre-defined value, determining that the condition for re-transmitting the determined one or more data packets is met; and
   based on determining that the configured third parameter is less than or equal to the first pre-defined value, determining that the condition for re-transmitting the determined one or more data packets is not met.

8. The system as claimed in claim 5, wherein the at least one processor of the first network node is configured to execute the instructions to determine whether or not the condition for re-transmitting the determined one or more data packets is met by:
   configuring a fourth parameter based on the determined information of the lost one or more data packets;
   determining whether or not the configured fourth parameter is greater than a second pre-defined value;

based on determining that the configured fourth parameter is greater than the second pre-defined value, determining that the condition for re-transmitting the determined one or more data packets is met; and based on determining that the configured fourth parameter is less than or equal to the second pre-defined value, determining that the condition for re-transmitting the determined one or more data packets is not met.

9. A method, performed by at least one processor, comprising:

transmitting, by a first network node, one or more data packets stored in a buffer to a second network node during a handover operation;

determining, by the first network node, whether or not a re-transmission of the one or more data packets is required;

determining, by the first network node, a type of the re-transmission, based on determining that the re-transmission is required;

re-transmitting, by the first network node, the one or more data packets based on the determined type of the re-transmission, the type of re-transmission being determined from among a first type using predefined configurations for one or more parameters, and a second type using dynamic configurations for the one or more parameters, the predefined configurations being values of the one or more parameters that are predefined prior to the handover operation, and the dynamic configurations being values of the one or more parameters that are defined or adjusted by the first network node during the handover operation; and clearing, by the first network node, the one or more data packets from the buffer, based on determining that the re-transmission is not required, wherein the first network node is a source base station of the handover operation, and the second network node is a target base station of the handover operation.

10. The method as claimed in claim 9, further comprising:

determining, by the first network node, whether or not one or more data packets have been lost during transmission; and based on determining that one or more data packets have been lost during transmission, determining information of the lost one or more data packets.

11. The method as claimed in claim 10, wherein the type of re-transmission is a re-transmission based on one or more dynamic configurations.

12. The method as claimed in claim 11, wherein the determining whether or not the re-transmission of the one or more data packets is required comprises:

configuring a first parameter based on the determined information of the lost one or more data packets;

determining a state of the configured first parameter;

based on determining that the configured first parameter comprises a first state, determining that the re-transmission of the one or more data packets is required; and based on determining that the configured first parameter comprises a second state, determining that the re-transmission of the one or more data packets is not required.

13. The method as claimed in claim 11, wherein the re-transmitting the one or more data packets comprises:

determining one or more data packets to be re-transmitted;

determining whether or not a condition for re-transmitting the determined one or more data packets is met; and based on determining that the condition is met, re-transmitting the determined one or more data packets to the second network node.

14. The method as claimed in claim 13, wherein the determining the one or more data packets to be re-transmitted comprises:

configuring a second parameter based on the determined information of the lost one or more data packets; and determining the one or more data packets to be re-transmitted based on the configured second parameter.

15. The method as claimed in claim 13, wherein the determining whether or not the condition for re-transmitting the determined one or more data packets is met comprises:

configuring a third parameter based on the determined information of the lost one or more data packets;

determining whether or not the configured third parameter is greater than a first pre-defined value;

based on determining that the configured third parameter is greater than the first pre-defined value, determining that the condition for re-transmitting the determined one or more data packets is met; and based on determining that the configured third parameter is less than or equal to the first pre-defined value, determining that the condition for re-transmitting the determined one or more data packets is not met.

16. The method as claimed in claim 13, wherein the determining whether or not the condition for re-transmitting the determined one or more data packets is met comprises:

configuring a fourth parameter based on the determined information of the lost one or more data packets;

determining whether or not the configured fourth parameter is greater than a second pre-defined value;

based on determining that the configured fourth parameter is greater than the second pre-defined value, determining that the condition for re-transmitting the determined one or more data packets is met; and based on determining that the configured fourth parameter is less than or equal to the second pre-defined value, determining that the condition for re-transmitting the determined one or more data packets is not met.

17. A non-transitory computer-readable recording medium having recorded thereon instructions executable by a processor to cause the processor to perform a method comprising:

transmitting, by a first network node, one or more data packets stored in a buffer to a second network node during a handover operation;

determining, by the first network node, whether or not a re-transmission of the one or more data packets is required;

determining, by the first network node, a type of the re-transmission, based on determining that the re-transmission is required;

re-transmitting, by the first network node, the one or more data packets based on the determined type of re-transmission, the type of re-transmission being determined from among a first type using predefined configurations for one or more parameters, and a second type using dynamic configurations for the one or more parameters, the predefined configurations being values of the one or more parameters that are predefined prior to the handover operation, and the dynamic configurations being values of the one or more parameters that are defined or adjusted by the first network node during the handover operation; and clearing, by the first network node, the one or more data packets from the buffer, based on determining that the re-transmission is not required, wherein the first network node is a source base station of the handover operation, and the second network node is a target base station of the handover operation.

18. The non-transitory computer-readable recording medium as claimed in claim 17, wherein the method further comprises:

determining, by the first network node, whether or not one or more data packets have been lost during transmission; and based on determining that one or more data packets have been lost during transmission, determining information of the lost one or more data packets.

19. The non-transitory computer-readable recording medium as claimed in claim 18, wherein the type of re-transmission is a re-transmission based on one or more dynamic configurations.

20. The non-transitory computer-readable recording medium as claimed in claim 19, wherein the re-transmitting the one or more data packets comprises:

determining one or more data packets to be re-transmitted;

determining whether or not a condition for re-transmitting the determined one or more data packets is met; and based on determining that the condition is met, re-transmitting the determined one or more data packets to the second network node.

* * * * *